United States Patent
Kimmons et al.

(10) Patent No.: US 8,273,973 B2
(45) Date of Patent: Sep. 25, 2012

(54) BOW HOLD TRAINING DEVICE

(75) Inventors: Ruth Kimmons, West Orange, NJ (US); Martha Brons, Greenville, SC (US)

(73) Assignee: Things 4 Strings, LLC, West Orange, NJ (US)

( * ) Notice: Subject to any disclaimer, the term of this patent is extended or adjusted under 35 U.S.C. 154(b) by 16 days.

(21) Appl. No.: 12/990,008

(22) PCT Filed: Feb. 4, 2009

(86) PCT No.: PCT/US2009/033025
§ 371 (c)(1),
(2), (4) Date: Jan. 12, 2011

(87) PCT Pub. No.: WO2009/134494
PCT Pub. Date: Nov. 5, 2009

(65) Prior Publication Data
US 2011/0094365 A1    Apr. 28, 2011

Related U.S. Application Data

(60) Provisional application No. 61/125,876, filed on Apr. 29, 2008, provisional application No. 61/132,443, filed on Jun. 18, 2008.

(51) Int. Cl.
*G10D 3/16* (2006.01)
(52) U.S. Cl. ................ 84/282; 84/281; 84/325
(58) Field of Classification Search ............ 84/281, 84/282
See application file for complete search history.

(56) References Cited

U.S. PATENT DOCUMENTS

| | | | | |
|---|---|---|---|---|
| 248,467 | A * | 10/1881 | Hunt | 84/282 |
| 384,045 | A * | 6/1888 | Latchmore | 84/282 |
| 1,435,926 | A * | 11/1922 | Johnson | 84/282 |
| 1,483,994 | A * | 2/1924 | Stadniczek | 84/282 |
| 1,632,003 | A * | 6/1927 | Gaynor | 84/282 |
| 1,673,996 | A * | 6/1928 | Rathsach | 84/282 |
| 1,763,660 | A * | 6/1930 | Knopp | 84/282 |
| 1,897,225 | A * | 2/1933 | Archer | 84/282 |
| 2,003,161 | A * | 5/1935 | Turner | 84/282 |
| 2,452,396 | A * | 10/1948 | Shopmaker | 84/282 |
| 2,740,312 | A * | 4/1956 | Vestergaard | 84/282 |

(Continued)

FOREIGN PATENT DOCUMENTS
WO    2007040299    4/2007

OTHER PUBLICATIONS
International Search Report dated Mar. 19, 2009.

*Primary Examiner* — David Warren
*Assistant Examiner* — Robert W Horn
(74) *Attorney, Agent, or Firm* — Pepper Hamilton LLP

(57) ABSTRACT

Training devices for facilitating proper bow holds on bow sticks of bowed stringed instruments. An exemplary training device may include a fingers stabilizer having a body with one or more thumb opening walls that define a thumb opening in the body. The thumb opening walls and/or the thumb opening may guide a thumb to the bow stick and position an end of the thumb at an approximate intersection of a bow stick frog and a bow stick shaft. The body may also include a finger separator that helps position an index finger and a middle finger on the bow stick. The fingers stabilizer may also have contact areas for positioning a ring finger and a pinky finger on the bow stick.

37 Claims, 15 Drawing Sheets

U.S. PATENT DOCUMENTS

| | | | | |
|---|---|---|---|---|
| 2,820,388 | A * | 1/1958 | Rolland | 84/282 |
| 3,839,938 | A * | 10/1974 | Williams | 84/465 |
| D257,152 | S * | 9/1980 | Alshin | D17/20 |
| D286,543 | S * | 11/1986 | Jablonski | D17/20 |
| D289,526 | S * | 4/1987 | Fortunato | D17/20 |
| D367,668 | S * | 3/1996 | Lindauer | D17/20 |
| 6,777,600 | B2 * | 8/2004 | Daring | 84/281 |
| D577,058 | S * | 9/2008 | Krovoza | D17/20 |
| 7,595,441 | B1 * | 9/2009 | DuBell-Shockley | 84/282 |
| D650,828 | S * | 12/2011 | Kimmons | D17/20 |
| D650,829 | S * | 12/2011 | Kimmons | D17/20 |
| D650,830 | S * | 12/2011 | Kimmons et al. | D17/20 |
| 2008/0271585 | A1 * | 11/2008 | Jones | 84/281 |
| 2011/0094365 | A1 * | 4/2011 | Kimmons et al. | 84/325 |

* cited by examiner

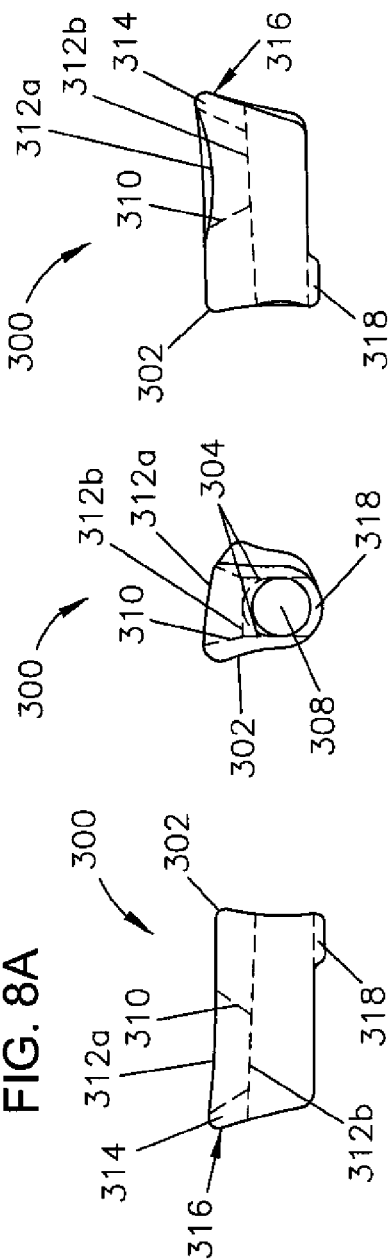

BOW HOLD TRAINING DEVICE

CROSS-REFERENCE TO RELATED APPLICATIONS

This application is the U.S. National Stage filing under 35 U.S.C. §371 of International Application Serial No. PCT/US2009/033025 filed Feb. 4, 2009, which claims benefit under 35 U.S.C. §119(e) of provisional U.S. Patent Application Ser. No. 61/125,876, filed Apr. 29, 2008 entitled "VIOLIN AND VIOLA BOW HOLD TRAINING SYSTEM," and provisional U.S. Patent Application Ser. No. 61/132,443 filed Jun. 18, 2008 and entitled "CELLO BOW HOLD TRAINING DEVICE," the disclosures of which are incorporated herein by reference to their entirety.

This application is related by subject matter to U.S. Design application Ser. No. 29/331,911, filed on Feb. 4, 2009 and entitled "VIOLIN AND VIOLA BOW HOLD TRAINING DEVICE," U.S. Design application Ser. No. 29/331,912, filed on Feb. 4, 2009 and entitled "VIOLIN AND VIOLA BOW HOLD TRAINING DEVICE FOR PINKY FINGER," and U.S. Design application Ser. No. 29/331,913, filed on Feb. 4, 2009 and entitled "CELLO BOW HOLD TRAINING DEVICE."

TECHNOLOGY FIELD

The present disclosure generally relates to the teaching of bowed stringed instruments, and more particularly, to training devices for facilitating a proper bow hold on a bow stick of a bowed stringed instrument, such as instruments of the violin family.

BACKGROUND

Bowed stringed instruments, such as the instruments of the violin family (e.g., violins, violas, cellos, etc.), may include, among other things, tensioned strings, a bridge, a fingerboard, a hollow body, and a bow stick. The bow stick may have natural or synthetic horse hair, which may be moved over the instrument's strings to set the strings into vibration to produce sound. The sound of the vibrating strings may be amplified through the hollow body, and then projected through openings on either side of the bridge. The pitch of the sound may be changed by changing the effective length of the strings, i.e., by pressing certain portions of the strings against the fingerboard.

Each finger of the player's hand is used to control the various aspects of tone production with the bow stick. The path and placement of the bow stick, as well as the amount of pressure being applied to the strings with the bow stick, influence the type and quality of the sound produced by the instrument. For example, movement of the bow stick at a ninety-degree angle across the strings generally results in the production of clear tones. In addition, fine control of the bow stick pressure generally affords greater precision in the articulation of the produced tones. Effective control over the path, placement, and pressure of the bow stick are generally dependent upon achieving a proper bow hold.

It is often difficult for players, particularly beginner and intermediate players, of bowed stringed instruments to learn how to properly hold the bow stick. For example, a proper bow hold typically involves the use of all five fingers, each having a different position and task. As such, a proper bow hold may be complex, and may not come naturally to some players. In addition, student bow sticks often do not have well-defined ridges against which a player's fingers may anchor. Moreover, many student bow sticks are manufactured out of materials other than wood, such as metal-reinforced fiberglass. These materials may be heavier than wood, and may give student bow sticks a very smooth surface that is difficult to handle. Thus, student bow sticks may be more difficult to control than traditional bow sticks, thereby making it more difficult to learn how to play bowed stringed instruments.

SUMMARY

The disclosed embodiments include training devices for facilitating proper bow holds on bow sticks of bowed stringed instruments, such as fiddles, violins, violas, cellos, and the like. The training devices may be used in conjunction with various types bow sticks, such as a violin bow stick, viola bow stick, or cello bow stick. In one embodiment, the training device may include a fingers stabilizer that properly positions a thumb, an index finger and a middle finger of a right hand, for example, on a bow stick to facilitate a stable and effective bow hold. The fingers stabilizer may include a body and one or more thumb opening walls that define a thumb opening in the body. The thumb opening walls and/or the thumb opening may guide a thumb to the bow stick and position an end of the thumb at an approximate intersection of a bow stick frog and a bow stick shaft. The fingers stabilizer may also include a finger separator that protrudes from the body. The finger separator may help position an index finger and a middle finger on the bow stick by separating the index and middle fingers from one another.

In another embodiment, the training device may include a ring and pinky fingers stabilizer, which may position a ring finger and a pinky finger on the bow stick to help these fingers of the right hand, for example, remain properly placed on the bow stick. The ring and pinky fingers stabilizer may further facilitate a stable and effective bow hold.

In another embodiment, the training device may include two separate fingers stabilizers. One of the fingers stabilizers may position a thumb, an index finger and a middle finger on the bow stick while the other fingers stabilizer may position a ring finger and a pinky finger on the bow stick. Use of both fingers stabilizers may help the fingers of the right hand, for example, remain properly placed on the bow to facilitate a stable and effective bow hold. In addition, use of two fingers stabilizers may enable the training device to accommodate different hand sizes.

In yet another embodiment, the training device may include a thumb, index, middle, ring, and pinky fingers stabilizer that properly positions each of the fingers of the right hand, for example, on the bow stick to facilitate a stable and effective bow hold.

Additional features and advantages of the disclosed embodiments will be made apparent from the following detailed description of illustrative embodiments that proceeds with reference to the accompanying drawings.

BRIEF DESCRIPTION OF THE DRAWINGS

The foregoing and other aspects of the disclosed embodiments will be better understood from the following detailed description with reference to the drawings.

FIGS. 8A and 8B are top and front views, respectively, of the other fingers stabilizer shown in FIG. 3;

FIGS. 8C and 8D are right side and rear views, respectively, of the other fingers stabilizer shown in FIG. 3;

FIGS. 8E and 8F are left side and bottom views, respectively, of the other fingers stabilizer shown in FIG. 3;

DETAILED DESCRIPTION OF ILLUSTRATIVE EMBODIMENTS

Figure 1:
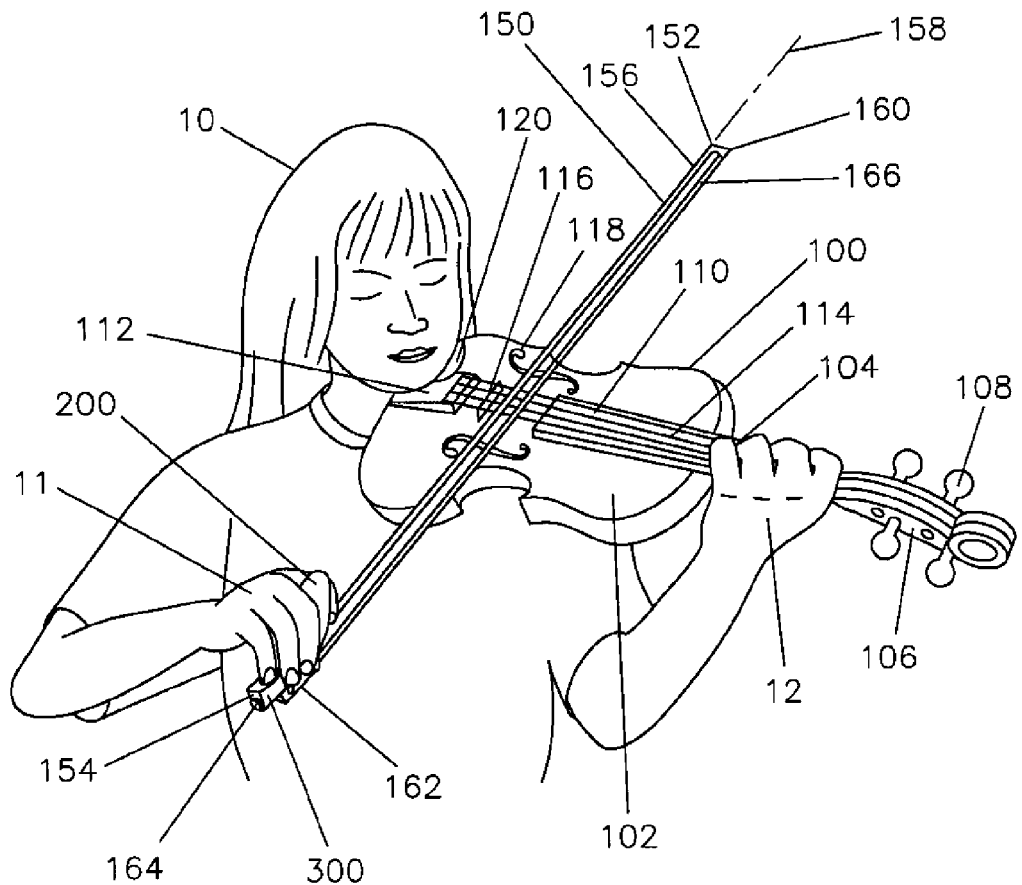
FIG. 1 is a perspective view of a person playing a violin using an exemplary bow hold training device having two fingers stabilizers disposed on a violin bow stick.

The disclosed embodiments are directed to bow hold training devices that may be used in conjunction with bowed stringed instruments (e.g., fiddles, violins, violas, cellos, etc.) to achieve a relaxed and effective bow hold. The bow hold training devices generally help to shape and train players' hands to properly hold a bow stick, thereby facilitating the learning process for playing bowed stringed instruments. The bow hold training devices may be particularly well-suited for beginner and/or unskilled players, who may have difficulty learning the complex mechanics of a proper bow hold.

The bow hold training devices generally act to fill in some of the empty spaces adjacent to a player's fingers, thereby encouraging the player's fingers to find and stay in their proper places during the bow hold. Preferably, the bow hold training devices do not interfere with the customary points of contact between the player's fingers and the surfaces of a bow stick. The bow hold training devices may include one or more fingers stabilizers that may be used to properly position and stabilize the player's fingers at or near an end of the bow stick, proximal to a bow stick frog. The fingers stabilizers may include one or more elements that encourage a player's fingers to find and stay in desired positions on the bow stick. The bow hold training devices may be used in conjunction with various types and sizes of bowed stringed instruments, including full and fractional sizes, and may accommodate various player hand sizes, from child to adult.

The fingers stabilizer(s) of a bow hold training device may be integrally formed with, or removably attached to, the bow stick. In one embodiment, the fingers stabilizer(s) may be temporarily attached to an existing bow stick.

To achieve a proper bow hold for a violin or viola, for example, a player's right wrist may be positioned above a frog of a bow stick. The player's right pinky finger may rest on the bow stick, at an angle to a shaft of the bow stick. The player's right pinky finger may be slightly separated from the player's right ring finger, just as the ring and pinky fingers separate slightly when hanging from a relaxed hand, while not separated so much that the joints of the player's right pinky finger cannot achieve a curved shape capable of extending and flexing. The shaft of the bow stick may have a polygonal cross-section at the frog and, therefore, may define multiple ridges (e.g., an octagonal cross-section may define eight ridges). The tip of the player's pinky finger may anchor against the nearly topmost of the ridges. The player's right middle and ring fingers may rest on a surface of the bow stick, with the tip of the player's middle finger draped over the side of the frog.

The technique for holding and using a cello bow stick may differ slightly from that of the violin or viola bow stick due to the differences in playing position. When playing bowed stringed instruments, a player generally rests an inside corner of his or her flexed right thumb on the underside of the bow stick, opposite the right middle finger, at an approximate intersection of the bow stick shaft and the curved end of the frog. When playing a violin or viola, the player generally flexes the first joint of the thumb at approximately a forty-five degree angle with respect to a longitudinal axis of the bow stick shaft. By contrast, when playing a cello, the player generally flexes the first joint of the thumb at approximately a thirty degree angle with respect to the longitudinal axis of the bow stick shaft.

The player of bowed stringed instruments may use the inside corner of the thumb as a point of contact at the approximate intersection of the bow stick shaft and the curved end of the frog. The thumb preferably approaches the intersection at an angle of approximately forty-five degrees. The angle the thumb approaches the bow stick may affect the ability of the thumb and palm muscles to remain relaxed. The players' index finger may rest on the top of the bow's wrapping, between the first two joints of the index finger, such that downward pressure can be applied on the bow stick. The index finger may be slightly separated from the middle finger, just as the fingers separate slightly when hanging from a relaxed hand. The points of contact of the player's pinky finger and index finger on the top of the bow stick are preferably equidistant from the point of contact of the player's thumb on the bottom of the bow stick. The pad of the player's middle finger may contact the frog near the base. The pad of the cello player's pinky finger may rest on the outside of the frog, often near the decorative eye, depending on the size of the player's hand.

Correct index finger placement on the bow stick generally improves tone production and articulation by allowing for control of downward pressure, known in violin pedagogy as "pronation." Correct and relaxed positioning of the middle two fingers is important to tone production because much of the downward pressure of the bow stick is controlled by arm weight through the fingers. The player's thumb preferably approaches the intersection at approximately a forty-five degree angle so it can exert controlled pressure up into the bow stick or relieving pressure at the frog of the bow. The angle at which the thumb approaches the bow stick allows the thumb to act as a fulcrum between the frog end of the bow stick and the tip, allows the thumb to exert lateral pressure on the contoured edge of the frog, and encourages the thumb and palm muscles to be more relaxed.

FIG. 1 is a perspective view of a person 10 playing a violin 100 using an exemplary bow hold training device, which may include fingers stabilizers 200 and 300, though it will be appreciated that the fingers stabilizers 200 and 300 may be used independently of each other. In addition, while the fingers stabilizers 200 and 300 are depicted as two separate pieces, it will further be appreciated that the fingers stabilizers 200 and 300 may be formed as a single piece in other embodiments. The fingers stabilizers 200 and 300 may be disposed at or near an end of a violin bow stick 150 and may be used to properly position each of the person's fingers on the bow stick 150. In addition, the fingers stabilizers 200 and 300 may provide ergonomic support and cushioning for arthritic or fatigued hands. The overall design of the fingers stabilizers 200 and 300 may minimize any interference with the fingers' normal points of contact on the surface of the bow stick 150.

The violin 100 may be constructed from wood, such as maple or spruce, and may include a hollow body 102 and a neck 104. The hollow body 102 may be connected to one end of the neck 104 and a peg box 106 may be connected to the other end of the neck 104. The peg box 106 may include one or more pegs 108. The violin 100 may include a fingerboard 110 that extends the entire length of the neck 104 and over at least a portion of the hollow body 102.

The violin 100 may also include one or more strings 114 and a tailpiece 112, which may be located at an end of the hollow body 102 opposite the neck 104. Each string 114 may be tensioned between one of the pegs 108 and the tailpiece 112. The strings 114 may be supported by a bridge 116, which may be located between the tailpiece 112 and an end of the fingerboard 110. The hollow body 102 may define openings 118, i.e., "f-holes," on either side of the bridge 116. The f-holes 118 may project sound produced by the vibrating strings. The violin 100 may include a chin rest 120 at an end of the hollow body 102 opposite the neck 104.

The bow stick 150 may include a distal end 152, a proximal end 154 opposite the distal end 152, and a shaft 156 extending between the ends 152 and 154 along a longitudinal axis 158. The bow stick 150 may further include a tip 160 at the distal end 152 and a frog 162 proximal to the proximal end 154. The frog 162 may define a curved recess 163 (see FIG. 2B). The frog 162 may be mounted to the shaft 156 of the bow stick 150 via a screw mechanism 164, which may extend into the proximal end 154 along the longitudinal axis 158. At least a portion of the shaft 156 may define a polygonal cross-section (e.g., an octagonal cross-section).

The violin bow stick 150 may include natural or synthetic bow hair 166, which may extend from the tip 160 to the frog 162. The bow stick 150 may also include a ferrule 168 on the frog 162 (see, e.g., FIGS. 2B and 2C). The ferrule 168 may cover the area where the bow hair 166 is attached to the frog 162. A saddle 170 (see, e.g., FIGS. 2A and 2B), which may be a thin metal strip, may be disposed between the frog 162 and the shaft 156 and extend parallel to the longitudinal axis 158. The saddle 170 may enable the frog 162 to move along the longitudinal axis 158 of the shaft 156 to increase or decrease the tension on the bow hair 166. The frog 162 may be moved along the shaft 156 by tightening or loosening the screw mechanism 164.

To play the violin 100, the person 10 may hold the bow stick 150 at the frog 162 using his or her right hand 11, as shown in FIG. 1. The person 10 may position his or her left hand 12 so that the left thumb is positioned under the neck 104 of the violin 100. The remaining four fingers of the left hand 12 may be placed over the strings 114. The person 10 may use the chin rest 120 to support the bottom portion of the hollow body 102 between the person's chin and shoulder.

The person 10 may press one or more of the strings 114 against the fingerboard 110 to change the strings' effective length. This may alter the pitch of the sound produced when the strings 114 are set into vibration. For example, as shown in FIG. 1, the person 10 may move the bow hair 166 across the strings 114 between the bridge 116 and the fingerboard 110, thereby causing the strings 114 to vibrate. The sound produced by the vibrating strings 114 may be amplified by the hollow body 102 and then projected by the f-holes 118.

The placement, path and pressure of the bow stick 150, when in contact with the strings 114, may influence the quality of the produced sound. For example, the bow stick 150 may be moved in a direction that is generally perpendicular to the strings 114 to facilitate the production of a clear tone. To exert optimal control over the bow stick 150, the person 10 preferably should maintain a proper bow hold, which may be facilitated by the exemplary fingers stabilizer 200 and/or fingers stabilizer 300 shown in FIG. 1.

Figure 2A:
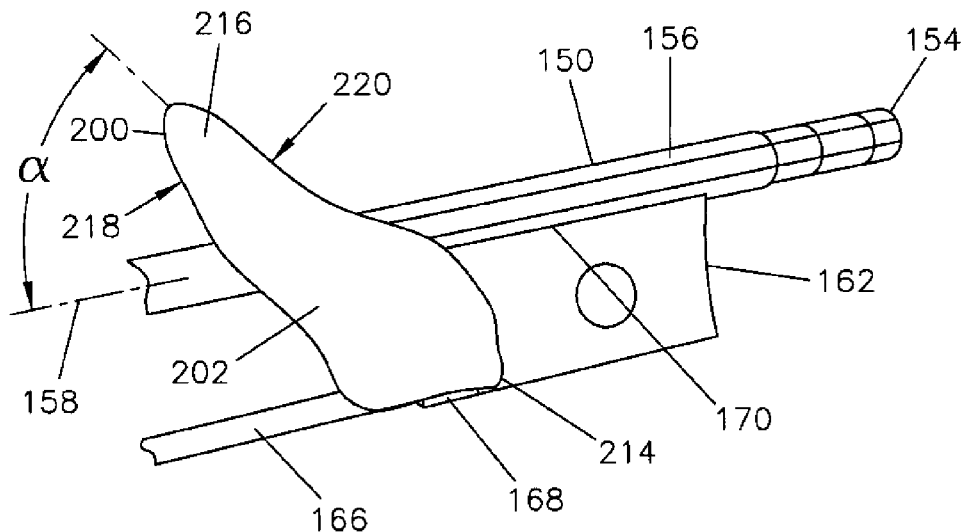
FIGS. 2A and 2B are perspective views of an end of the bow stick with one of the fingers stabilizers disposed thereon.
Figure 2B:
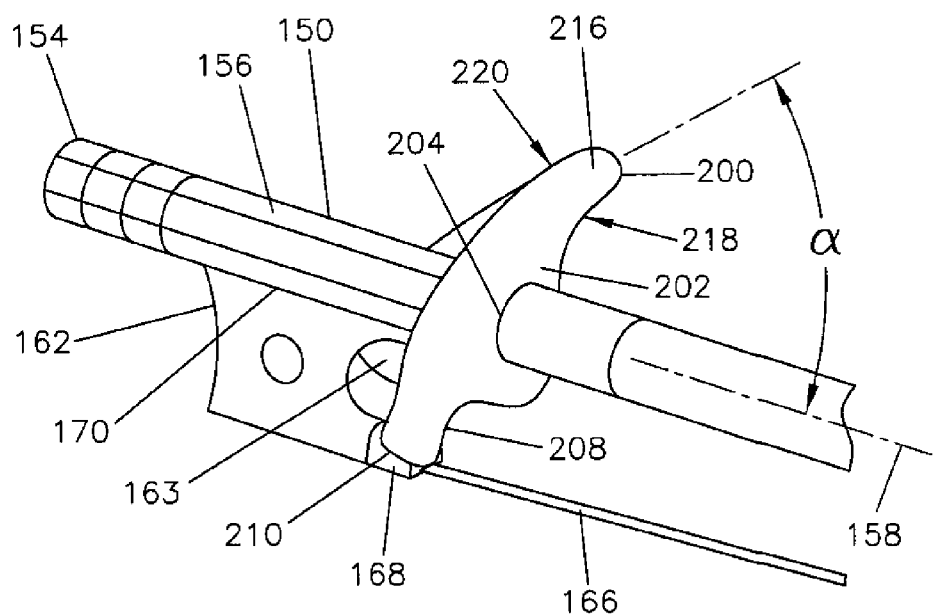
Figure 2C:
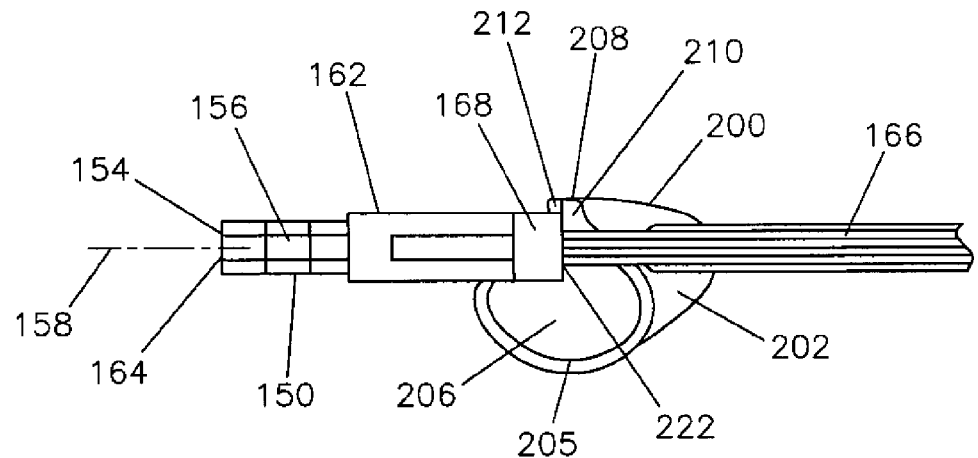
FIG. 2C is a bottom view of the end of the bow stick with the fingers stabilizer shown in FIGS. 2A and 2B disposed thereon.

FIGS. 2A and 2B are perspective views of an end of the bow stick 150 with the fingers stabilizers 200 disposed thereon. FIG. 2C is a bottom view of the end of the bow stick 150 with the fingers stabilizer 200 disposed thereon. FIGS. 7A-7F are right side, rear, bottom, top, front, and left side views, respectively, of the fingers stabilizer 200. As will be further discussed below in connection with FIGS. 4-6, the fingers stabilizer 200 may be used to properly position a person's index finger, middle finger, and thumb on the bow stick 150 during a bow hold.

The fingers stabilizer 200 may be made from any suitable rigid or resilient material (e.g., molded silicone rubber). In one embodiment, the material of the fingers stabilizer 200 may be resilient enough to adapt to measurement variations in the size of the bow stick 150 (e.g., the bow stick 150 and any bow wrappings of slightly varying cross-sectional areas) and/or the fingers of the person 10.

The fingers stabilizer 200 may include a body 202. The body 202 of the fingers stabilizer 200 may be contoured such that the bow stick 150 may be stored in a bowed stringed instrument case (not shown) with the fingers stabilizer 200 disposed thereon. The fingers stabilizer 200 may be disposed on the bow stick 150 such that the body 202 has an axis that is generally parallel to the longitudinal axis 158 of the shaft 156. Thus, the longitudinal axis 158 shown in FIG. 2A, for example, generally corresponds to the axis of the body 202.

The fingers stabilizer 200 may define a shaft passageway or shaft hole 204 (see, e.g., FIG. 7A), which may extend through at least a portion of the body 202. The shaft hole 204 may extend generally parallel to the axis of the body 202 and/or the longitudinal axis 158 of the shaft 156. The shaft hole 204 may have a diameter that is greater than, or approximately equal to, the diameter of the shaft 156. Thus, as shown in FIG. 2B, a portion of the shaft 156 may be received within the shaft hole 204, thereby securing the fingers stabilizer 200 to the bow stick 150. Preferably, the fingers stabilizer 200 is designed so that it may slide up and down the bow stick in conjunction with the movement of the frog 162 during the string tensioning process. Although not required, the body 202 may be designed to resemble an animal, or some other decorative object.

Figure 7A:
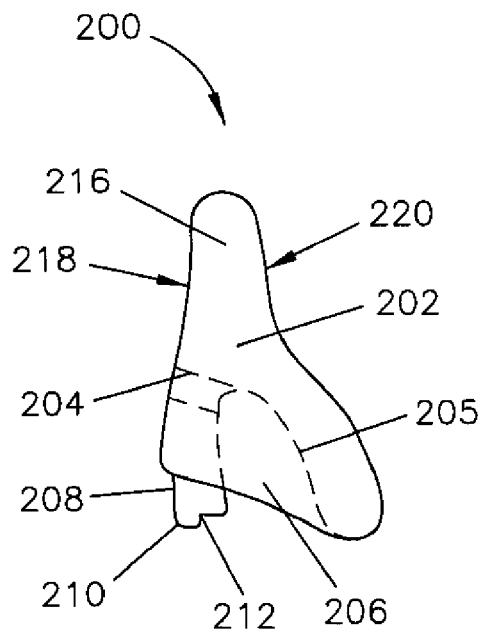
FIGS. 7A and 7B are right side and rear views, respectively, of the fingers stabilizer shown in FIGS. 2A-2C.
Figure 7B:
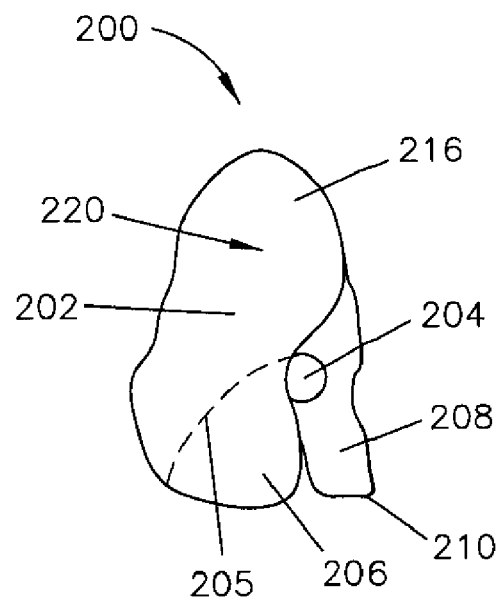
Figure 7C:
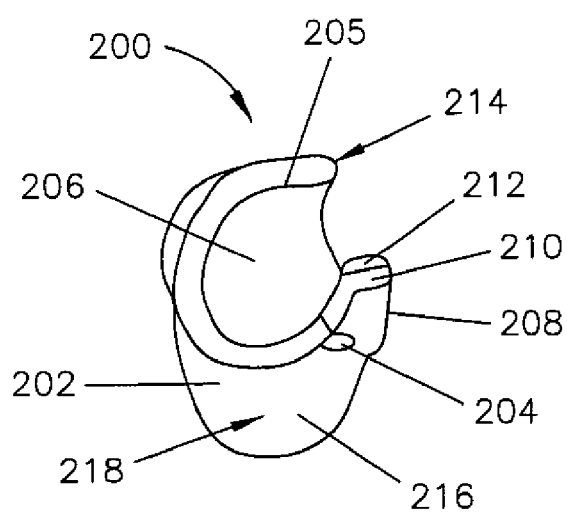
FIGS. 7C and 7D are bottom and top views, respectively, of the fingers stabilizer shown in FIGS. 2A-2C.
Figure 7D:
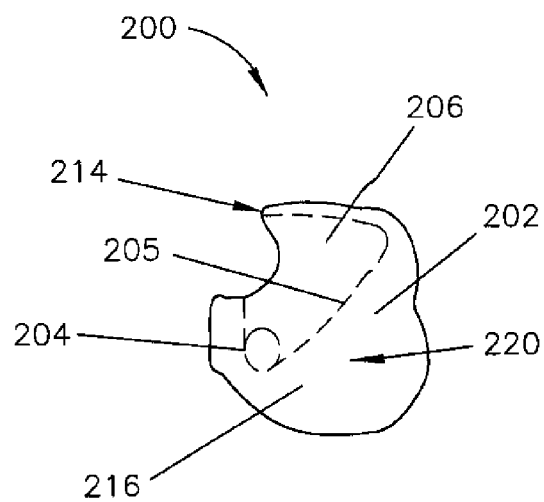
Figure 7E:
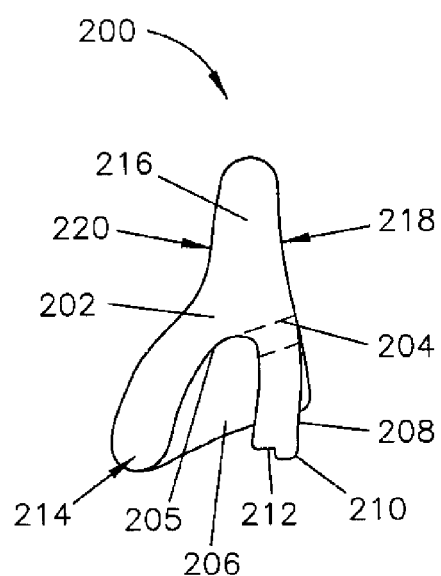
FIGS. 7E and 7F are left side and front views, respectively, of the fingers stabilizer shown in FIGS. 2A-2C.
Figure 7F:
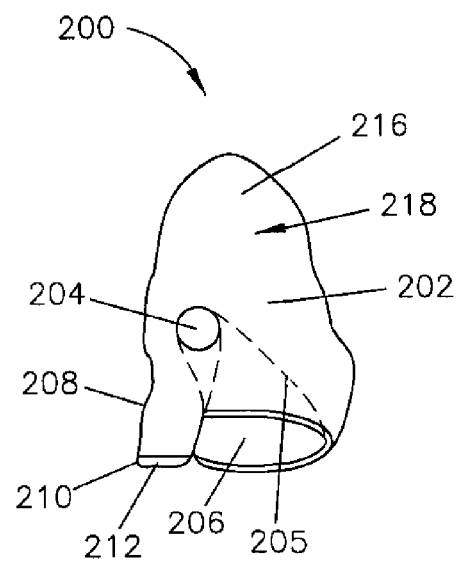

The fingers stabilizer 200 may include one or more thumb opening walls 205 (see, e.g., FIG. 7A) that define a thumb opening 206 in the body 202 (see, e.g., FIG. 7C). The thumb opening 206 may be sized and shaped to receive at least a portion of the thumb. The thumb opening walls 205 and/or the thumb opening 206 may be used to help position an end of the thumb at an area 222 (see FIG. 2C), i.e., the approximate intersection of the frog 162 and the shaft 156. Once inserted in the thumb opening 206, the thumb opening walls 205 may encourage a first joint of the thumb is to remain appropriately flexed when the other fingers are placed on the bow stick 150. The surface of the thumb opening walls 205 may have a rough texture to its frictional coefficient. This may help prevent the thumb from slipping out of position when disposed in the thumb opening 206. The surface of the device may include a textured surface for comfort. In one embodiment, a textured surface may be provided in those areas that will contact a player's fingers and/or hand. For example, a textured surface may be provided one or more of the following areas: the plane of the fingers stabilizer 200 that abuts the index finger and/or ring finger, the walls of the pinky finger opening of finger stabilizer 300, and the outer surface of the finger stabilizer 500 that contact the fingers.

As will be further discussed below in connection with FIGS. 4-6, the thumb opening walls 205 may guide the thumb to the bow stick 150 at an angle of about forty-five degrees with respect to axis of the body 202 and/or the longitudinal axis 158 of the shaft 156. The thumb opening walls 205 may also encourage a joint of the thumb to bend during the bow hold. Preferably, the thumb opening walls 205 encourage the joint of the thumb to bend at an angle of about forty-five degrees with respect to axis of the body 202 and/or the longitudinal axis 158. The thumb opening 206 may expose a portion of the shaft 156 extending through the shaft hole 204. As such, the thumb opening 206 may facilitate physical contact between an inside corner of the thumb and the bow stick 150.

As shown in FIGS. 2B and 2C, the fingers stabilizer 200 may include a post 208 that extends from the body 202 at a non-zero angle with respect to axis of the body 202 and/or the longitudinal axis 158. The post 208 may include a post end 210 that abuts the frog 162 proximal the ferrule 168. The post end 210 may define a post notch 212 (see FIG. 7A) that receives a portion of the frog 162 and/or the ferrule 168 to help secure the fingers stabilizer 200 against the frog 162. Thus, the post 208 may locate the fingers stabilizer 200 at the proper position along a length of the shaft 156 and prevent the fingers stabilizer 200 from sliding too close to the proximal end 154 of the shaft 156. The proper placement of the fingers stabilizer 200 along the length of the shaft 156 may help ensure that the person's index finger, middle finger, and thumb will be located at the desired positions on the bow stick 150.

The fingers stabilizer 200 may include a lateral stabilizing surface 214 (see, e.g., FIG. 7E) extending from the body 202. The lateral stabilizing surface 214 may abut a side of the frog 162 on the bow stick 150. The lateral stabilizing surface 214 may prevent the fingers stabilizer 200 from rotating circumferentially around the shaft 156 of the bow stick 150.

The fingers stabilizer 200 may also include a finger separator 216 extending from the body 202. The finger separator 216 may form a protrusion on the body 202. The finger separator 216 may, among other things, appropriately space the index and middle fingers, prevent the hand from over wrapping around the bow stick 150, and prevent inadvertent lateral hand movements along the bow stick 150. The finger separator 216 may extend from the body 202 at a non-zero angle with respect to the axis of the body 202 and/or the longitudinal axis 158 of the shaft 156. In one embodiment, the finger separator 216 may extend at an angle of approximately forty-five degrees with respect to the axis of the body 202 and/or the longitudinal axis 158 and may protrude about one inch above the shaft 156. Preferably, the finger separator 216 has a thickness equal to about one-half the thickness of the person's index finger. The finger separator 216 may have a surface 218 for abutting the index finger and an opposing surface 220 for abutting the middle finger. The surfaces 218 and 220 may be generally straight, or may be contoured to receive a portion of the index and/or middle fingers. Thus, the surfaces 218 and 220 of the finger separator 216 may be used to position the index and middle fingers, respectively, on the bow stick 150.

To mount or attach the fingers stabilizer 200 to the bow stick 150, the frog 162 may be removed from the bow stick 150 by loosening the screwing mechanism 164. The proximal end 154 of the shaft 156 may then be inserted through the shaft hole 204 along the longitudinal axis 158. The frog 162 may be re-attached to the shaft 156 and then secured via the screwing mechanism 164. In other embodiments, the fingers stabilizer 200 may be integrally formed with the bow stick 150. As shown, the fingers stabilizer 200 should be disposed on the shaft 156 so that the finger separator 216 is titled towards the distal end 152.

Figure 3:
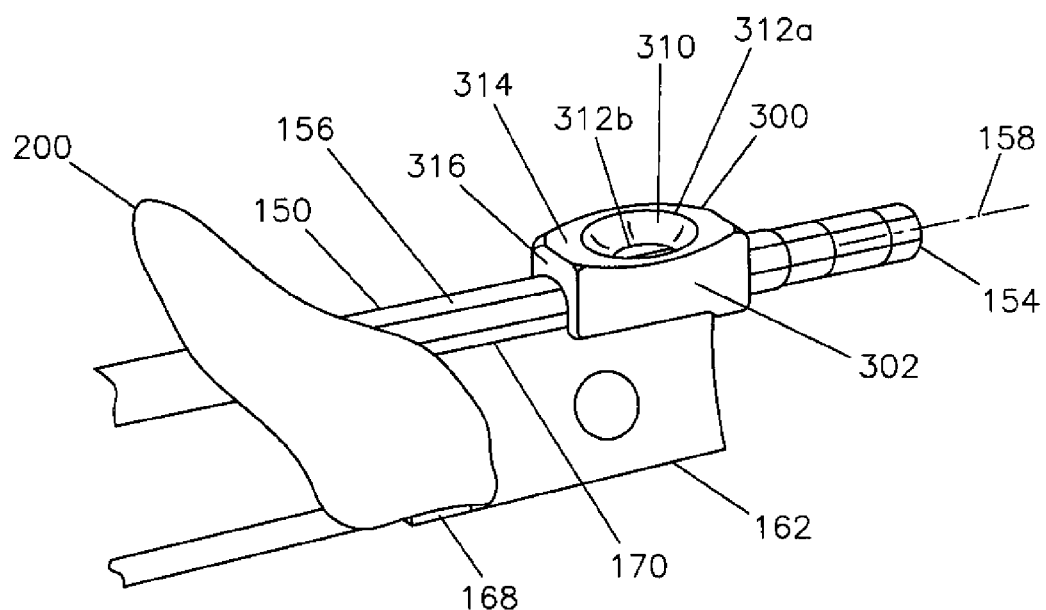
FIG. 3 is a perspective view of the end of the bow stick with both of the fingers stabilizers shown in FIG. 1 disposed thereon.

FIG. 3 is a perspective view of the fingers stabilizers 200 and 300, each disposed at or near the proximal end 154 of the bow stick 150, proximal to the frog 162. FIGS. 8A-8F are top, front, left side, rear, right side, and bottom views, respectively, of the fingers stabilizer 300. As will be further discussed below in connection with FIGS. 4-6, the fingers stabilizer 300 may properly position a person's ring finger and pinky finger on the bow stick 150 during the bow hold.

As shown in FIG. 3, the fingers stabilizer 300 may be disposed on the shaft 156 close to the proximal end 154. Once installed, the fingers stabilizer 300 may be positioned by sliding it along the shaft 156 until it becomes flush against the person's ring finger while the person is performing a bow hold. When properly installed, the fingers stabilizer 300 may appropriately space the ring and pinky fingers, and may also prevent inadvertent lateral hand movement toward the distal end 152 of the bow stick 150.

The fingers stabilizer 300 may be made from any suitable rigid or resilient material (e.g., molded silicone rubber). In one embodiment, the material of the fingers stabilizer 300 may be resilient enough to adapt to measurement variations in the size of the bow stick 150. Preferably, the fingers stabilizer 300 is designed so that it may slide up and down at least a portion of the shaft 156.

The fingers stabilizer 300 may have a body 302. The fingers stabilizer 300 may be disposed on the bow stick 150 such that the body 302 has an axis that is generally parallel to the longitudinal axis 158 of the shaft 156. Thus, the longitudinal axis 158 shown in FIG. 3, for example, generally corresponds to the axis of the body 302. The fingers stabilizer 300 may include sidewalls 304, which may form a saddle (see, e.g., FIGS. 8B, 8D and 8F). The sidewalls 304 of the fingers stabilizer 300 may extend through at least a portion of the body 302 substantially parallel to the axis of the body 302 and/or the longitudinal axis 158 of the shaft 156. A first portion of the sidewalls 304 may define a slot 306 (see, e.g., FIGS. 8B and 8F). A second portion of the sidewalls 304 may be connected to one another via a connecting portion 318, thereby forming a securing ring or shaft hole 308 (see, e.g., FIGS. 8B and 8D). The shaft hole 308 may extend through a portion of the body 302 generally parallel to the axis of the body 302 and/or the longitudinal axis of the shaft 156.

The diameter of the sidewalls 304 may be greater than, or approximately equal to, the diameter of the shaft 156. Thus, as shown in FIG. 3, a portion of the shaft 156 may extend through the slot 306 and the shaft hole 308. The sidewalls 304 may extend over at least a portion of the shaft 156 to provide lateral stability to the fingers stabilizer 300 while it is mounted to the bow stick 150. The shaft hole 308 may receive the shaft 156 to secure the fingers stabilizer 300 to the bow stick 150. The connecting portion 318 may abut an end of the frog 162 to prevent the fingers stabilizer 300 from moving too far up the shaft 156, i.e., too close to the fingers stabilizer 200. Although not required, the body 302 may be designed to resemble an animal, or some other decorative object.

The fingers stabilizer 300 may have a pinky finger opening 312 in the body 302 for receiving at least a portion of the pinky finger, thereby allowing a tip of the pinky finger to make contact with the appropriate ridge on the shaft 156. As shown in FIG. 3, the pinky finger opening 312 may be defined via an opening 312a and an opening 312b in the body 302. The openings 312a and 312b may be connected to one another via tapered sidewalls 310 in the body 302. The tapered sidewalls 310 preferably have a height sufficient to help to prevent the pinky finger from slipping out of position when the pinky finger is disposed within the pinky finger opening, yet low enough to allow for pinky finger flexibility. In one embodiment, the tapered sidewalk 310 have a height of approximately one-quarter of an inch. As shown in FIG. 3, the diameter of the opening 312a may be greater than the diameter of the opening 312b. Thus, the pinky finger opening 312 may have a conical shape.

The pinky finger opening 312 may extend through a portion of the body 302 at a non-zero angle with respect to the axis of the body 302 and/or the longitudinal axis 158 of the shaft 156. As further shown in FIG. 3, the pinky finger opening 312 may expose a portion of the shaft 156 extending through the slot 306. Thus, the pinky finger opening 312 may facilitate physical contact between the pinky finger and the shaft 156. Moreover, the pinky finger opening 312 may be centered on one of the ridges of the shaft 156, which, as noted above, may define a polygonal cross section. In one embodiment, the pinky finger opening may be centered on one of the upper-most ridges of the shaft 156.

The fingers stabilizer 300 may further include a finger separator 314 on the body 302, adjacent the pinky finger opening 312. The finger separator 314 may have a surface 316 for abutting the ring finger. Thus, the finger separator 314 and surface 316 may be used to separate the pinky finger and the ring finger from one another during the bow hold. The fingers stabilizer 300 may be disposed on the shaft 156 so that the surface 316 is facing the distal end 152 of the bow stick 150.

To mount or attach the fingers stabilizer 300 to the bow stick 150, the shaft 156 may be inserted into the slot 306 and then the shaft hole 308 along the longitudinal axis 158. In other embodiments, the fingers stabilizer 300 may be integrally formed with the bow stick 150.

As shown in FIG. 3, the bow hold training device may employ a two-piece design, i.e., the fingers stabilizers 200 and 300 may be separate and distinct components of the device. Moreover, as noted above, the fingers stabilizer 300 may be slidably disposed on the shaft 156. As such, the person 10 may adjust the spacing between the fingers stabilizers 200 and 300 by sliding the fingers stabilizer 300 either towards or away from the fingers stabilizer 200. Thus, the spacing between the fingers stabilizers 200 and 300 may be increased to accommodate larger sized hands and may be decreased to accommodate smaller sized hands.

Figure 4:
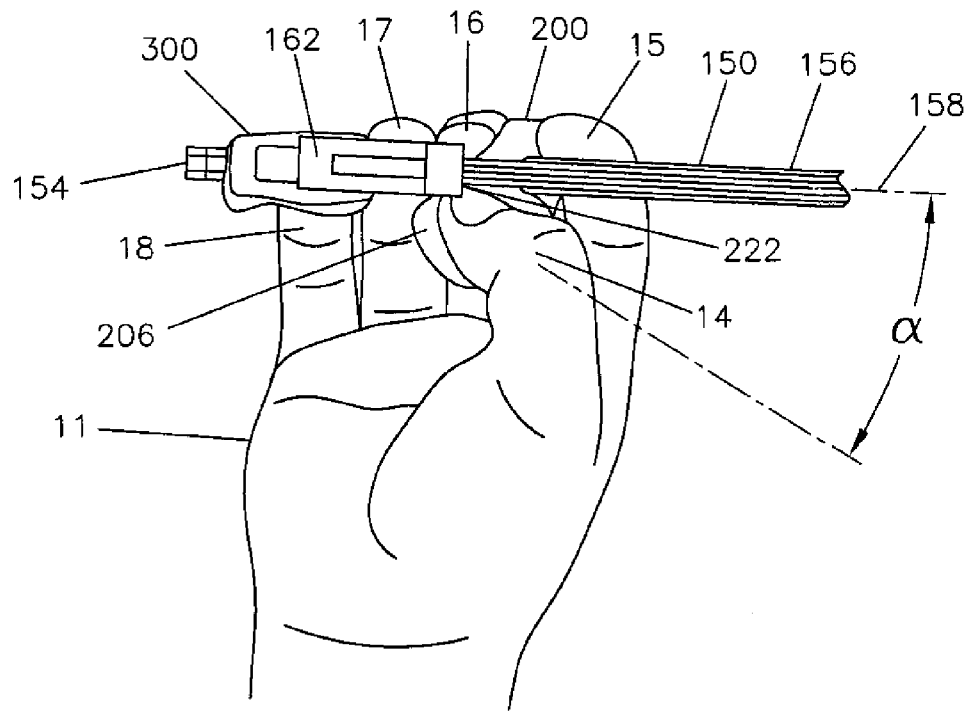
FIGS. 4, 5 and 6 are bottom, side, and rear views, respectively, of an exemplary bow hold utilizing the fingers stabilizers shown in FIG. 3.
Figure 5:
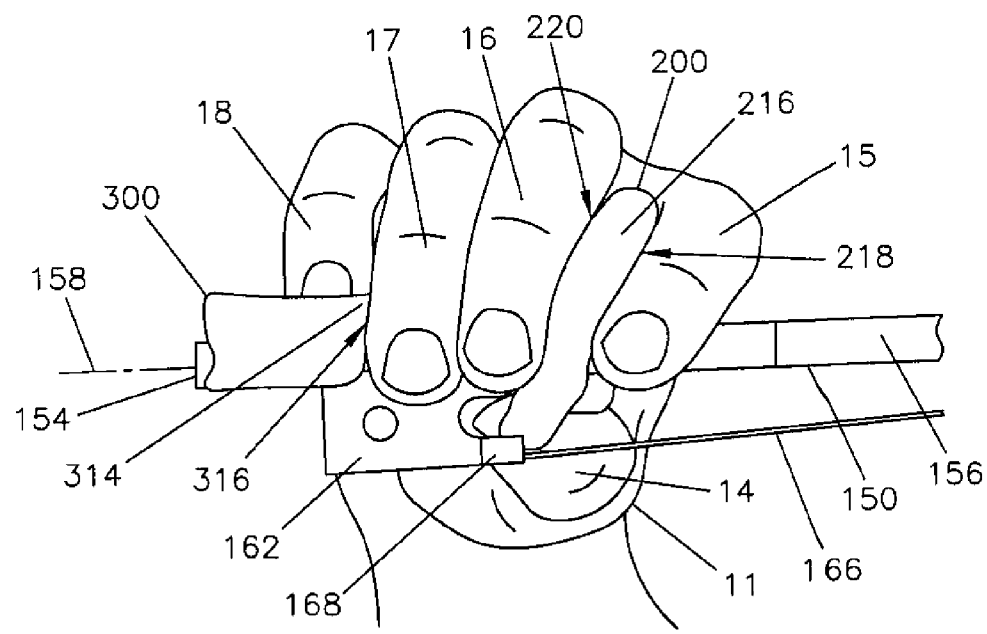
Figure 6:
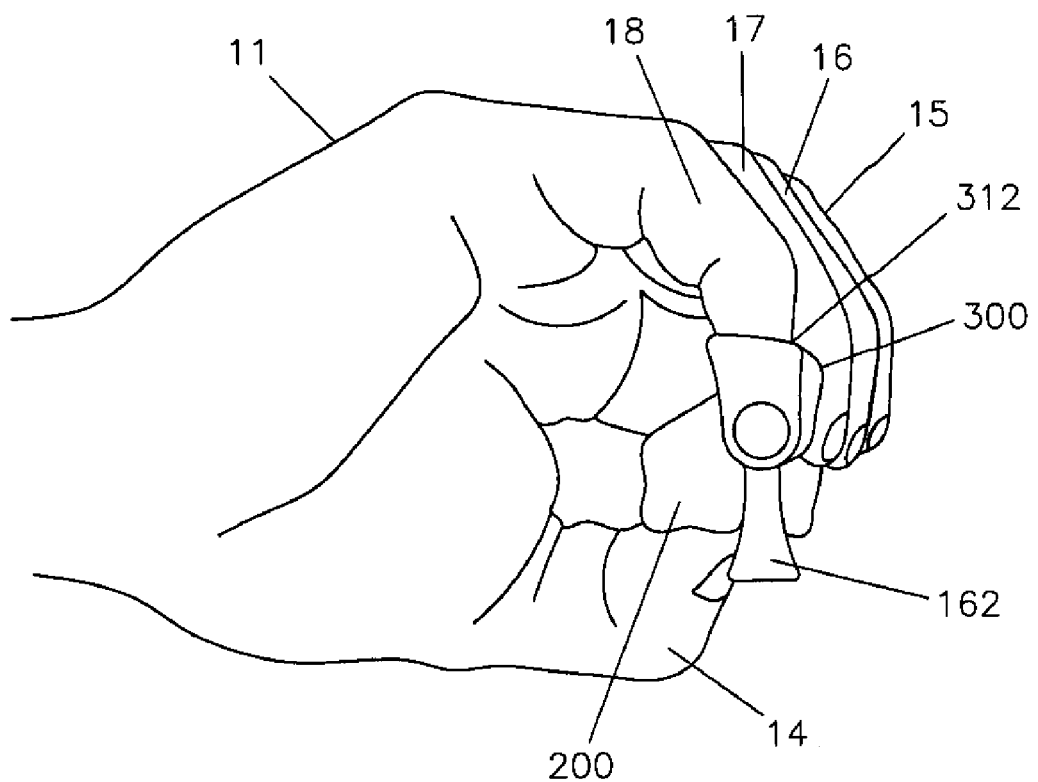

FIGS. 4, 5 and 6 are bottom, side, and rear views, respectively, of an exemplary bow hold using the fingers stabilizers 200 and 300. As shown in FIG. 4, the thumb opening 206 of the fingers stabilizer 200 may receive a portion of a thumb 14 of the right hand 11 of the person 10, though it will be appreciated that the fingers stabilizer 200 may be adapted to work in conjunction with the left hand 12. The thumb opening walls 205 and/or the thumb opening 206 may position the thumb 14 on the bow stick 150 at the area 222, i.e., the area where the frog 162 and the shaft 156 generally intersect or meet. As shown in FIG. 4, the thumb opening walls 205 and/or the thumb opening 206 may also guide the thumb 14 to the bow stick 150 at an angle of about forty-five degrees with respect to the longitudinal axis 158 of the shaft 156. The thumb opening walls 205 and/or the thumb opening 206 may further encourage a joint of the thumb 14 to bend during the bow hold. Preferably, the thumb opening walls 205 and/or the thumb opening 206 encourage the joint of the thumb to bend at an angle of about forty-five degrees with respect to the longitudinal axis 158.

A common error in thumb placement is to lock the thumb 14 in its extended position, thereby impeding the thumb 14 from exerting controlled upward pressure on the bow stick 150 and from assisting in up and down bow strokes. The application of controlled upward pressure is generally desirable because it aids in tone production and bow stroke articulation. By encouraging the thumb 14 to approach the bow stick 150 at an approximately forty-five degree angle (see, e.g., FIG. 4), and by encouraging the joint of the thumb to bend at an approximately forty-five degree angle, the thumb opening walls 205 and/or the thumb opening 206 generally enable the thumb 14 to exert both controlled upward pressure and controlled pressure towards the proximal end 154 of the bow stick 150. Moreover, the thumb opening walls 205 and/or thumb opening 206 may encourage the muscles in the thumb 14 and the palm of the right hand 11 to be more relaxed.

As noted above, the thumb opening 206 may expose a portion of the shaft 156 extending through the shaft hole 204 (see, e.g., FIGS. 7A and 7C). Thus, an inside corner of the thumb 14 may make physical contact with the shaft 156 and/or frog 162 at the area 222, as shown in FIG. 4. The thumb opening 206 may also allow for proper ventilation of the thumb 14 to minimize perspiration and/or discomfort.

As shown in FIG. 5, the finger separator 216 may be disposed between an index finger 15 and a middle finger 16 of the right hand 11. The finger separator 216 may fit into the webbing between the index and middle fingers 15 and 16, thereby preventing the right hand 11 from over wrapping the bow stick 150. The surface 218 of the finger separator 216 may abut the index finger 15, and the surface 220 of the finger separator 216 may abut the middle finger 16. Thus, the finger separator 216 may separate the index and middle fingers 15 and 16 from one another during the bow hold. Preferably, the finger separator 216 spaces the index finger 15 from the middle finger 16 as when the index and middle fingers 15 and 16 are hanging naturally from a relaxed hand. For example, the spacing may be about half the thickness of the index finger 15.

The surface 218 of the finger separator 216 may encourage the index finger 15 to make contact with the shaft 156 at an area between the first two joints of the index finger 15. This generally promotes tone production and articulation by facilitating controlled downward pressure, or pronation, when moving the bow stick 150 over the strings 114 of the violin 100.

Another common problem during bow holds is the tendency for the right hand 11 to wander towards the tip 160 at the distal end 152 of the bow stick 150, Because the finger separator 216 extends at a non-zero angle with respect to the axis of the body 202 and/or the longitudinal axis 158 of the shaft 156, the surface 220 of the finger separator 216 abuts the middle finger 16, thereby impeding the tendency of the right hand 11 to wander towards the distal end 152 when the person 10 is playing the violin 100.

Like the thumb opening walls 205, the surfaces 218 and 220 of the finger separator 216 may each have a rough texture, thereby increasing their respective frictional coefficients. This may help to compensate for any sweat or perspiration and prevent the index and middle fingers 15 and 16 from slipping out of position during the bow hold.

As shown in FIGS. 5 and 6, the pinky finger opening of the fingers stabilizer 300 may receive a portion of a pinky finger 18 of the right hand 11, though it will be appreciated that the fingers stabilizer 300 may be adapted for use with the left hand 12. It is generally desirable to have the pinky finger 18 placed on the shaft 156, towards the proximal end 154 of the bow stick 150, to counter the weight of the bow stick 150 when it is placed in its lower half on the violin 100. However, the person 10 may not be able to achieve sufficient leverage if the pinky finger 18 is too close to the point of contact of the thumb 14 on the bow stick 150. Conversely, the person 10 may not be able to properly curve the pinky finger 18 if it is placed too far from the ring finger 17. Thus, the fingers stabilizer 300 may be disposed at a location on the shaft 156 such that the distance between the thumb 14 and the pinky finger 18 is the generally same as the distance between the thumb 14 and the index finger 15. As a result, the fingers stabilizers 200 and 300 may encourage the thumb 14 to act as a fulcrum between the index finger 15 and the pinky finger 18. Moreover, the spacing between the fingers stabilizers 200 and 300 may encourage the middle finger 16 and the ring finger 17 to make physical contact with the bow stick 150.

The tapered sidewalls 310 of the pinky finger opening 312 may have a low-profile to help secure the placement of the pinky finger 18 on the bow stick 150 while also allowing the pinky finger 18 the freedom to straighten out a bit when a curves pinky finger is not necessary (e.g., when the bow stick 150 is placed in its upper-half on the violin 100). To facilitate control of tone production, the tapered sidewalls 310 may be angled slightly towards the palm of the right hand 11 so the pinky finger 18 is better able to exert controlled pressure on the shaft 156 in a direction generally perpendicular to the longitudinal axis 158.

As shown in FIG. 5, the surface 316 of the finger separator 314 may abut a ring finger 17 of the right hand 11. Thus, the finger separator 314 may separate the ring and pinky fingers 17 and 18 from one another to prevent the ring finger 17 from abutting the pinky finger 18 during the bow hold. Preferably, the finger separator 314 spaces the ring finger 17 from the pinky finger 18 as when the ring and pinky fingers 17 and 18 are hanging naturally from a relaxed hand. For example, the spacing may be about half the thickness of the index finger 15.

Figure 9:
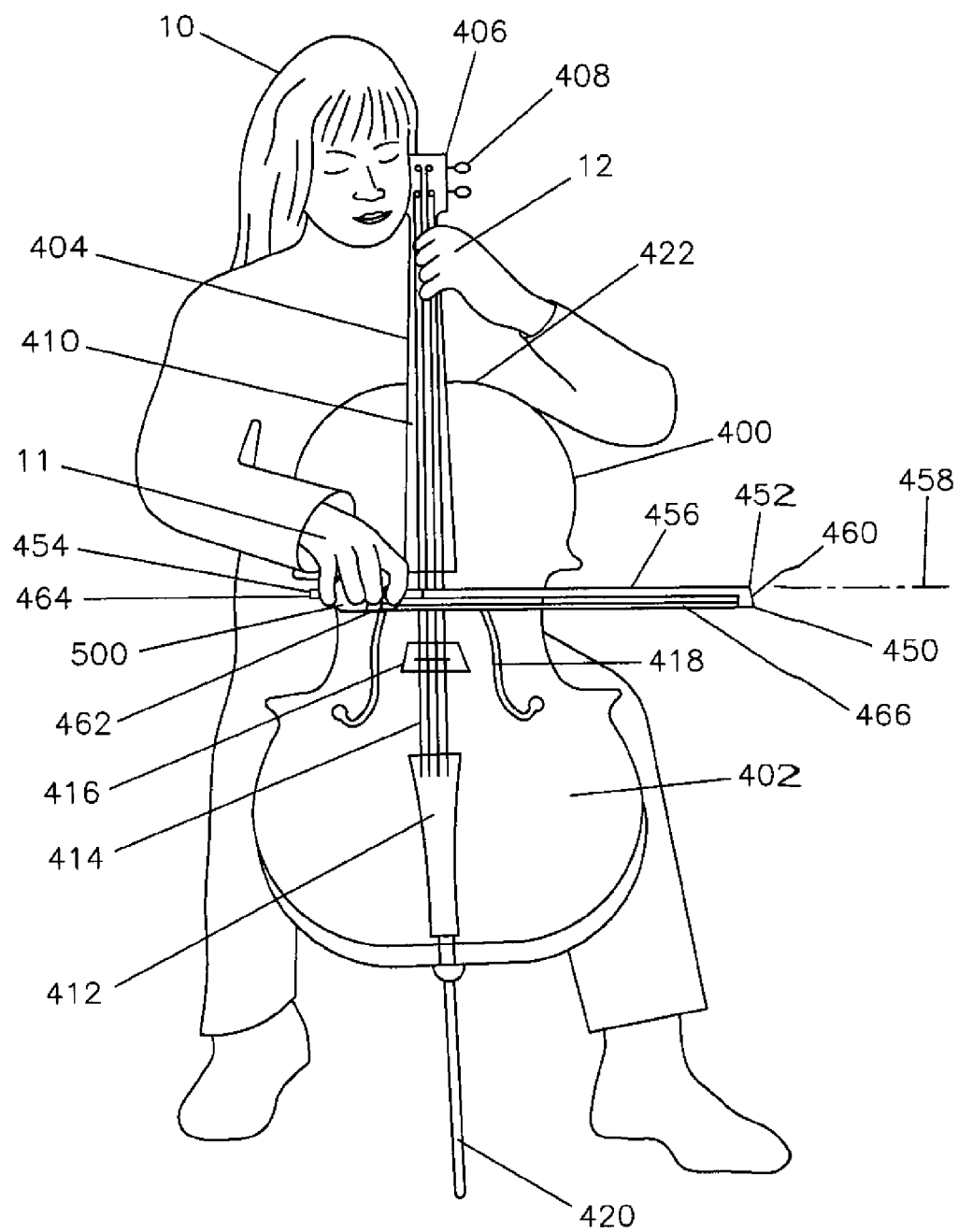
FIG. 9 is a perspective view of a person playing a cello using an exemplary bow hold training device having an exemplary fingers stabilizers disposed on a cello bow stick.

FIG. 9 is a perspective view of the person 10 playing a cello 400 using another exemplary bow hold training device, which may include a fingers stabilizer 500. The fingers stabilizer 500 may be disposed at or near an end of a cello bow stick 450. Like the violin 100 described above, the cello 400 may be constructed from wood, such as maple or spruce, and may include a hollow body 402 and a neck 404. The hollow body 402 may be connected to one end of the neck 404 and a peg box 406 may be connected to the other end of the neck 404. The peg box 406 may include one or more pegs 408. The cello 400 may include a fingerboard 410 that extends the entire length of the neck 404 and over at least a portion of the hollow body 402.

The cello 400 may also include a tailpiece 412, which may be located at an end of the hollow body 402 opposite the neck 404, and one or more strings 414. Each string 414 may be tensioned between one of the pegs 408 and the tailpiece 412. The strings 414 may be supported by a bridge 416, which may be located between the tailpiece 412 and an end of the fingerboard 410. The hollow body 402 may define f-holes 418 on either side of the bridge 416. The f-holes 418 may project sound produced by the vibrating strings. Instead of a chin rest, the cello 400 may include an end pin 420 at an end of the hollow body 402 opposite the neck 404.

The cello bow stick 450 may include many of the same or similar elements as the violin bow stick 150. For example, the cello bow stick 450 may include a distal end 452, a proximal end 454 opposite the distal end 452, and a shaft 456 extending between the ends 452 and 454 along a longitudinal axis 458. The bow stick 450 may further include a tip 460 at the distal end 452 and a frog 462 at or proximal to the proximal end 454. The frog 462 may be mounted to the shaft 456 of the bow stick 450 via a screw mechanism 464, which may extend into the proximal end 454 along the longitudinal axis 458. At least a portion of the shaft 456 may define a polygonal cross-section (e.g., an octagonal cross-section).

Like the violin bow stick 150, the bow stick 450 may include natural or synthetic bow hair 466, which may extend from the tip 460 to the frog 462. The bow stick 450 may also include a ferrule 468 on the frog 462 (see, e.g., FIG. 10). The ferrule 468 may cover the area where the bow hair 466 is attached to the frog 462. The bow hair 466 may be secured to the frog 462 via the ferrule 468. A saddle may be disposed between the frog 462 and the shaft 456 along the longitudinal axis 458. The saddle may enable the frog 462 to move along the longitudinal axis 458 of the shaft 456, thereby increasing or decreasing the tension on the bow hair 466. The frog 462 may be moved along the shaft 456 by tightening or loosening the screw mechanism 464.

To play the cello 400, the person 10 may place the cello 400 between his or her knees. The person 10 may rest the end pin 420 on a floor and a left back shoulder 422 of the cello 400 against his or her chest. The person 10 may hold the bow stick 450 at the frog 462 using his or her right hand 11. The person 10 may position his or her left hand 12 so that the left thumb is positioned under the neck 404. The remaining four fingers of the left hand 12 may be placed over the strings 414.

The person 10 may press the one or more of the strings 414 against the fingerboard 410 to change their effective length. This may alter the pitch of the sound produced when the strings 414 are set into vibration. For example, as shown in FIG. 9, the person 10 may move the bow hair 466 across the strings 414 between the bridge 416 and the fingerboard 410, thereby causing the strings 414 to vibrate. The sound produced by the vibrating strings 414 may be amplified by the hollow body 402 and then projected by the f-holes 418.

As with the violin bow stick 150, the placement, path and pressure of the cello bow stick 450, when in contact with the strings 414, may influence the quality of the produced sound. For example, the bow stick 450 may be moved in a direction that is generally perpendicular to the strings 414 to facilitate the production of a clear tone. To exert optimal control over the cello bow stick 450, the person 10 generally should maintain a proper bow hold, which may be facilitated by the exemplary fingers stabilizer 500.

Figure 10:
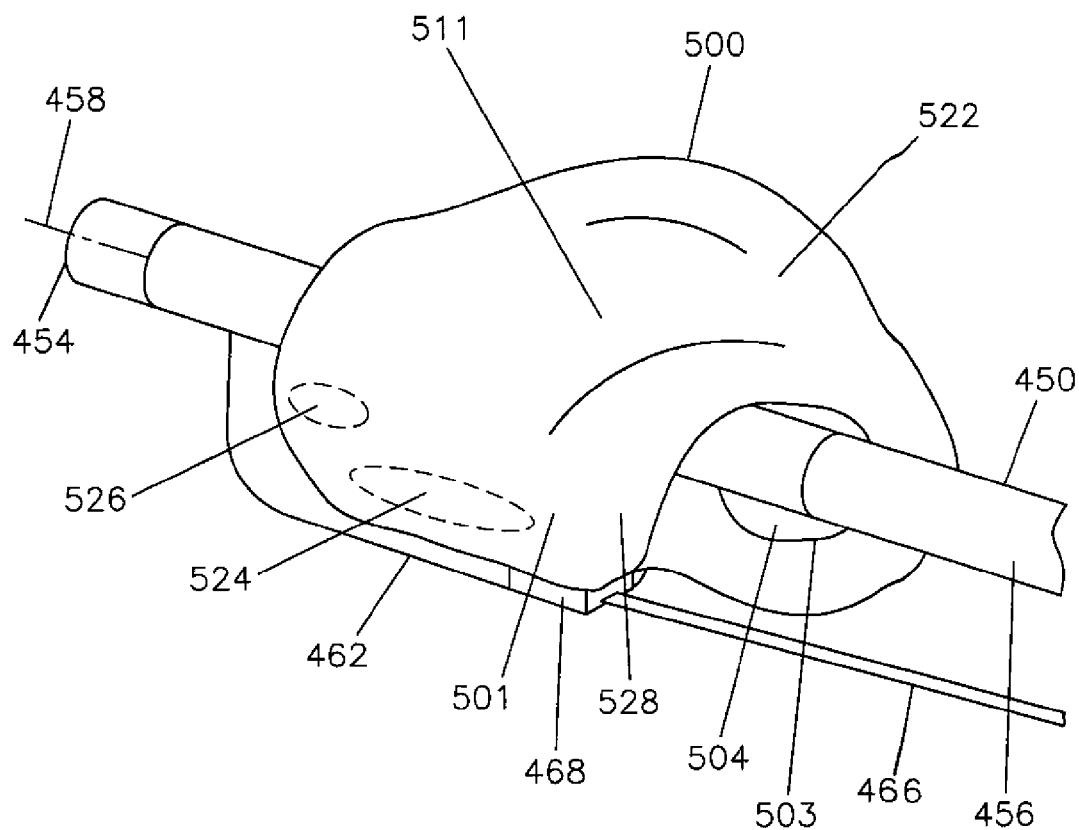
FIG. 10 is a left side perspective view of an end of the bow stick with the fingers stabilizer shown in FIG. 9 disposed thereon.

FIG. 10 is a perspective view of an end of the bow stick 450 with the fingers stabilizer 500 disposed thereon. FIGS. 14A-14F are left side, right side, top, bottom, front and rear views, respectively, of the fingers stabilizer 500. As will be further discussed below in connection with FIGS. 11-13, the fingers stabilizer 500 may be used to properly position the thumb 14, index finger 15, middle finger 16, ring finger 17, and pinky finger 18 of the right hand 11 on the bow stick 450 during a bow hold, though it will be appreciated that the fingers stabilizer 500 may be adapted for use with the left hand 12. In addition, the fingers stabilizers 500 may provide ergonomic support and cushioning for arthritic or fatigued hands.

The fingers stabilizer 500 may be made from any suitable rigid or resilient material (e.g., molded silicone rubber). In one embodiment, the material of the fingers stabilizer 500 may be resilient enough to adapt to measurement variations in the size of the bow stick 450. The fingers stabilizer 500 may include a body 501 and may be disposed on the bow stick 450 such that the body 501 has an axis that is generally parallel to the longitudinal axis 458 of the shaft 456. Thus, the longitudinal axis 458 shown in FIG. 10, for example, generally corresponds to the axis of the body 501. As shown in FIG. 10, a portion of the frog 462 may extend beyond the body 501, towards the proximal end 454. In addition, a portion of the frog 462 may extend below the body 501, thereby exposing at least a portion of the ferrule 468 on the frog 462. Some or all of the surfaces of the body 501 may be textured to help prevent the fingers stabilizer 500 from slipping out of position within the right hand 11 as a result of fatigue or perspiration, for example.

Figure 14A:
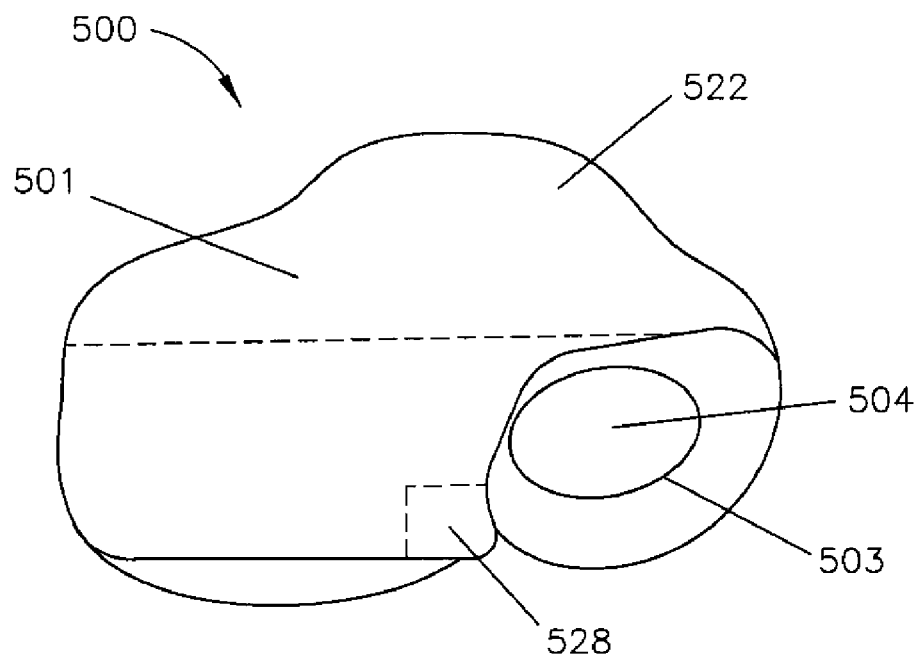
FIGS. 14A and 14B are left side and right side views, respectively, of the fingers stabilizer shown in FIG. 10.
Figure 14B:
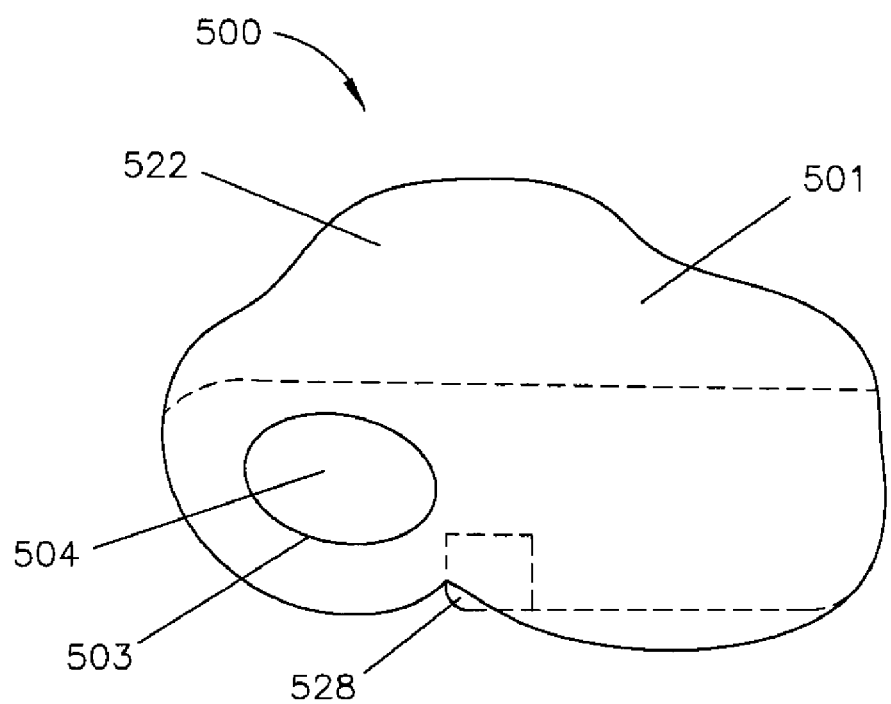
Figure 14C:
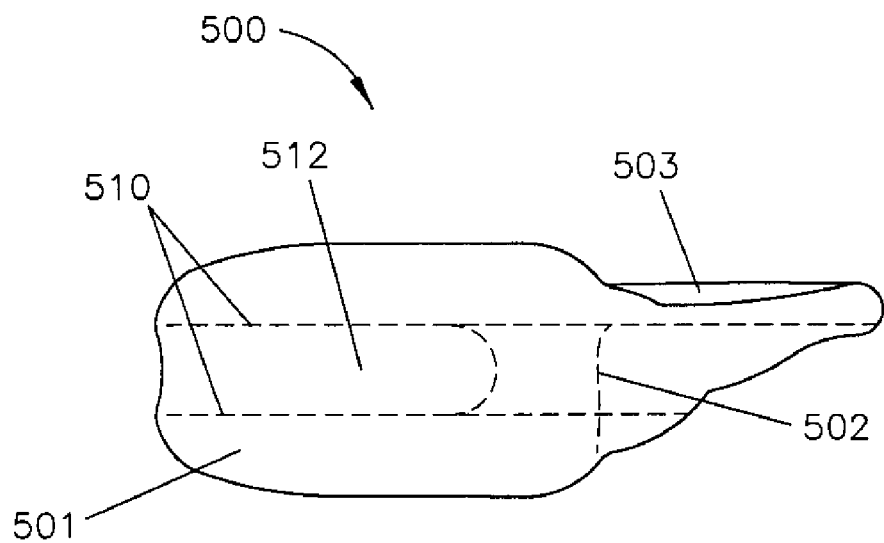
FIGS. 14C and 14D are top and bottom views, respectively, of the fingers stabilizer shown in FIG. 10.
Figure 14D:
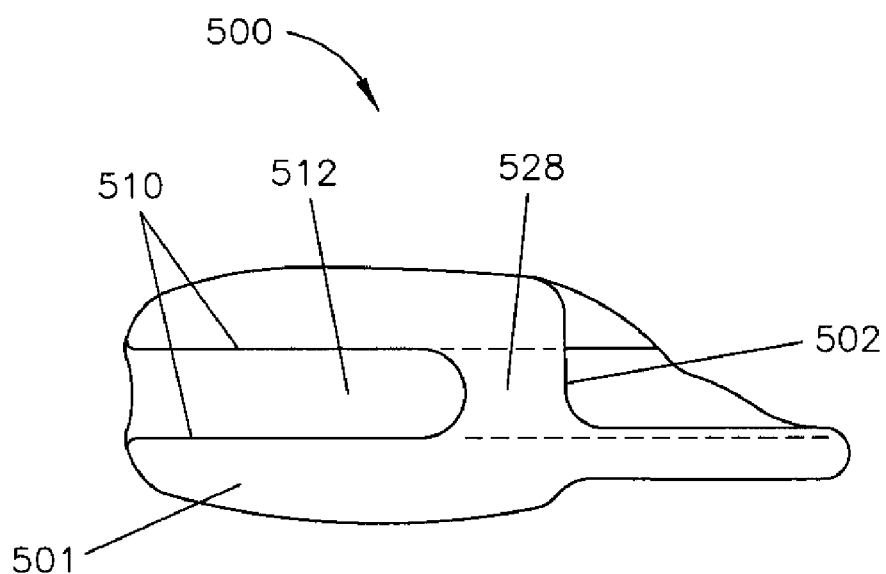
Figure 14E:
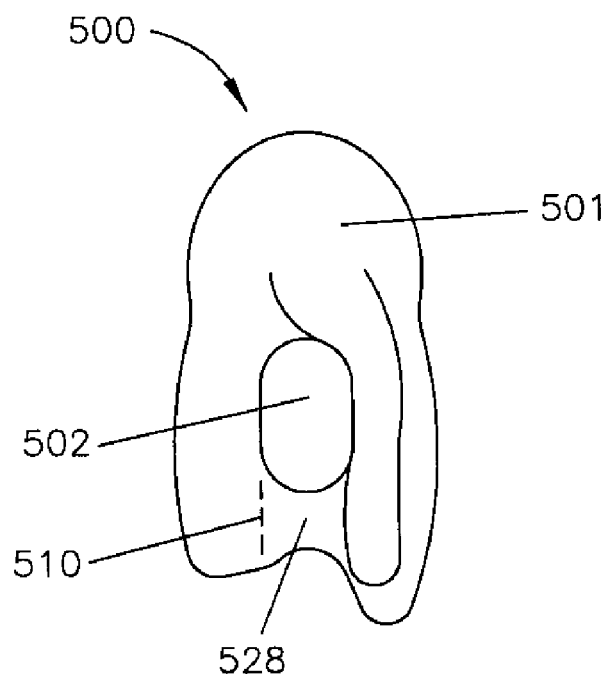
FIGS. 14E and 14F are front and rear views, respectively, of the fingers stabilizer shown in FIG. 10.
Figure 14F:
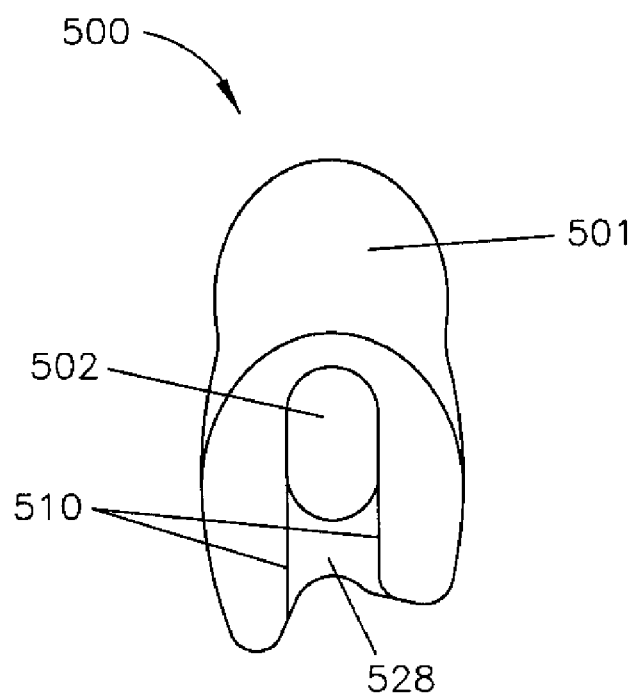

The fingers stabilizer 500 may have a shaft passageway or shaft hole 502 in the body 501 (see, e.g., FIGS. 14D-14F). The shaft hole 502 may extend through at least a portion of the body 501 generally parallel to the axis of the body 501 and/or the longitudinal axis 458 of the shaft 456. The shaft hole 502 may have a diameter that is greater than, or approximately equal to, the diameter of the shaft 456. Thus, as shown in FIG. 10, a portion of the shaft 456 may be received within the shaft hole 502, thereby securing the fingers stabilizer 500 to the bow stick 450. Although not required, the body 501 may be designed to resemble an animal, or some other decorative object.

The fingers stabilizer 500 may include sidewalls 510 (see, e.g., FIGS. 14C, 14D and 14F). The sidewalls 510 may extend through at least a portion of the body 501 substantially parallel to the axis of the body 501 and/or the longitudinal axis 458. The sidewalls 510 in the body 501 may define a slot 512, which may intersect with the shaft hole 502. Like the shaft hole 502, a width of the slot 512 may be greater than, or approximately equal to, the diameter of the shaft 456. Thus, a portion of the shaft 456 may be received within both the slot 512 and the shaft hole 502. The sidewalls 510 may extend over at least a portion of the shaft 456 and the frog 162 to provide lateral stability to the fingers stabilizer 500, i.e., to prevent the fingers stabilizer 500 from rotating circumferentially around the shaft 456 of the bow stick 450.

The fingers stabilizer 500 may have one or more thumb opening walls 503 that define a thumb opening 504 in the body 501 (see, e.g., FIG. 14B). The thumb opening 504 may extend through at least a portion of the body 501 at a non-zero angle with respect to the axis of the body 501 and/or the longitudinal axis 458. The thumb opening walls 503 and/or the thumb opening 504 generally allow for the inside corner of the thumb 14 to make appropriate contact with the bow shaft 456. The thumb opening walls 503 and/or the thumb opening 504 also keep the thumb 14 from seeking less desirable points of contact, and help stabilize the right hand 11 so that the hand 11 will be unable to migrate toward the tip 460 of the bow stick 450.

The thumb opening walls 503 and/or the thumb opening 504 may be sized and shaped to receive at least a portion of the thumb 14. The thumb opening walls 503 and/or the thumb opening 504 may be configured to position the thumb 14 at an approximate intersection of the frog 462 and the shaft 456. The thumb opening walls 503 and/or the thumb opening 504 may also be configured to guide the thumb 14 to the bow stick 450 at an angle of about forty-five degrees with respect to the axis of the body 501 or the longitudinal axis 458. In addition, the thumb opening walls 503 and/or the thumb opening 504 may encourage the joint of the thumb 14 to bend during the bow hold. Preferably, the thumb opening walls 503 and/or the thumb opening 504 encourage the joint of the thumb 14 to bend at an angle of about thirty degrees with respect to the axis of the body 501 and/or the longitudinal axis 458. The thumb opening 504 may expose a portion of the shaft 456 that is extending through the shaft hole 502. As such, the thumb opening 504 may facilitate physical contact between an inside corner of the thumb 14 and the bow stick 450.

The fingers stabilizer 500 may include a nester 528 (see, e.g., FIGS. 14A, 14B, 14E and 14F), which may extend across the body 501, below the shaft hole 502, at a non-zero angle with respect to the axis of the body 501 and/or the longitudinal axis 458 of the shaft 456. The nester 528 may nest within a recess of the frog 462 (see e.g., the recess 163 in FIG. 2B) to locate the fingers stabilizer 500 at the proper position along the length of the bow stick 450. Thus, the nester 528 may facilitate the proper placement of the fingers stabilizer 500 to help ensure that the thumb 14 will be properly positioned at the approximate intersection of the frog 462 and the shaft 456. The nester 528 may also help prevent the fingers stabilizer 500 from rotating circumferentially around the shaft 456.

As shown in FIG. 10, the fingers stabilizer 500 may have a contoured surface 511 that defines contact areas or finger indentations on the body 501. The contoured surface 511 and the contact areas of the fingers stabilizer 500 may assist the person 10 in maintaining a proper hand/finger curvature and shape when playing the cello 400. For example, the fingers stabilizer 500 may include a contact area 524 for abutting portions of the middle finger 16 and the ring finger 17. The finger stabilizer 500 may also include a contact area 526 for abutting a portion of the pinky finger 18, although in other embodiments a portion of the pinky finger 18 may abut the frog 462 instead (see, e.g., FIGS. 11-13). The contact areas 524 and 526 may define one or more recesses that help properly position and retain the middle finger 16, the ring finger 17 and the pinky finger 18 on the bow stick 450.

The fingers stabilizer 500 may include a finger separator 522 that help appropriately position, space and stabilize the index and middle fingers 15 and 16 on the bow stick 450. The fingers separator 522 may be a protrusion or mass on the body 501 that is disposed between the index finger 15 and the middle finger 16, thereby facilitating the separation of the index and middle fingers 15 and 16 from one another during the bow hold. Preferably, the finger separator 522 spaces the index finger 15 from the middle finger 16 as when the index and middle fingers 15 and 16 are hanging naturally from a relaxed hand. For example, the spacing may be about half the thickness of one of the index finger 15.

To mount or attach the fingers stabilizer 500 to the bow stick 450, the frog 462 may be removed from the bow stick 450 by loosening the screwing mechanism 464. The proximal end 454 of the shaft 456 may then be inserted through the shaft hole 502 along the longitudinal axis 458. The frog 462 may be re-attached to the shaft 456 and then secured via the screwing mechanism 464. In other embodiments, the fingers stabilizer 500 may be integrally formed with the bow stick 450.

Figure 11:
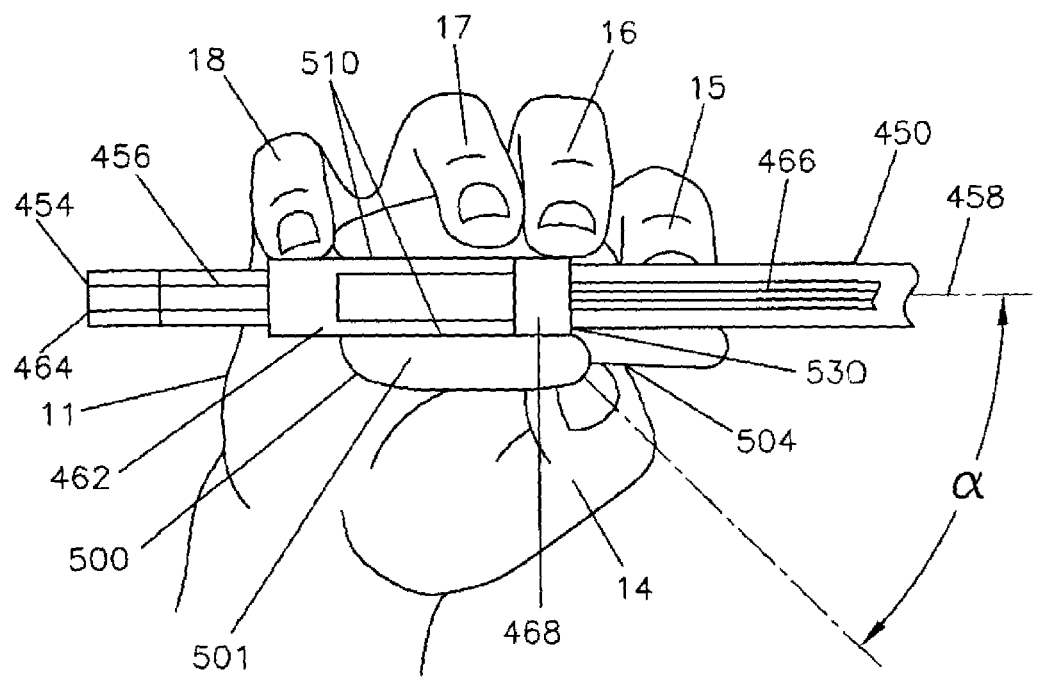
FIGS. 11, 12 and 13 are bottom, side, and rear views, respectively, of a proper bow hold utilizing the fingers stabilizer shown in FIG. 10.
Figure 12:
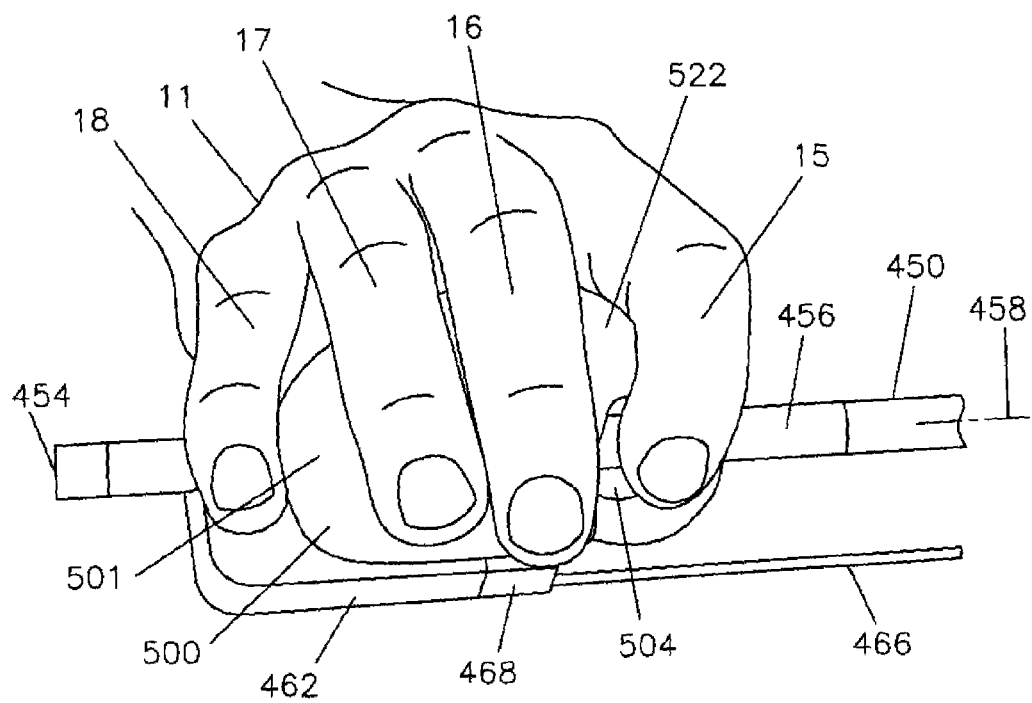
Figure 13:
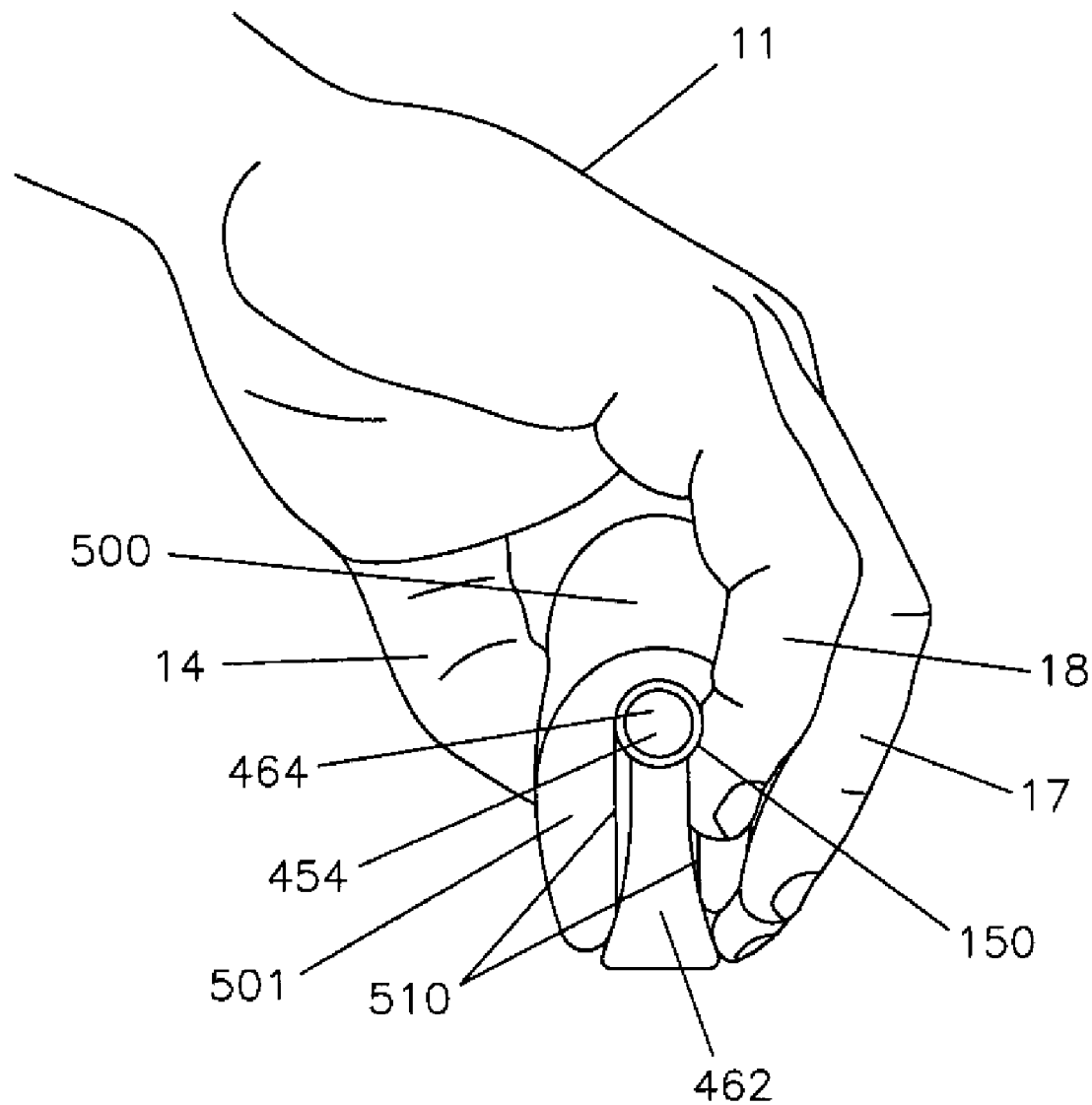

FIGS. 11, 12 and 13 are bottom, side, and rear views, respectively, of an exemplary bow hold using the fingers stabilizers 500. As shown in FIG. 11, the thumb opening 504 of the fingers stabilizer 500 may receive a portion of the thumb 14 of the right hand 11 of the person 10, though it will be appreciated that the fingers stabilizer 500 may be adapted for use with the left hand 12. The thumb opening walls 503 and/or thumb opening 504 may position the thumb 14 at an area 530 along a length of the bow stick 450, i.e., the area where the frog 462 and the shaft 456 generally intersect or meet. As shown in FIG. 11, the thumb opening walls 503 and/or thumb opening 504 may guide the thumb 14 to the bow stick 450 at an angle of about forty-five degrees with respect to the axis of the body 501 and/or the longitudinal axis 458 of the shaft 456. The thumb opening walls 503 and/or thumb opening 504 may encourage a joint of the thumb 14 to bend during the bow hold and generally prevent the thumb 14 from seeking less desirable points of contact along a length of the bow stick 450.

A common error in thumb placement is to lock the thumb 14 in its extended position, which may impede the thumb 14 from exerting controlled upward pressure on the bow stick 450 and from assisting in up and down bow strokes. The application of controlled upward pressure is generally desirable because it aids in tone production and bow stroke articulation. By encouraging the thumb 14 to approach the bow stick 450 at an angle of about forty-five degrees, and by encouraging a first joint of the thumb 14 to bend at an angle of about thirty degrees, the thumb opening walls 503 and/or the thumb opening 504 may help the thumb 14 act as a fulcrum between the ends 452 and 454 of the bow stick 450. Thus, the thumb opening walls 503 and/or the thumb opening 504 generally enable the thumb 14 to exert both controlled upward pressure and controlled pressure towards the proximal end 454 of the bow stick 450. Moreover, the thumb opening walls 503 and the thumb opening 504 may encourage the muscles in the thumb 14 and the palm of the right hand 11 to be more relaxed.

The thumb opening 504 may expose a portion of the shaft 456 extending through the shaft hole 502. Thus, the thumb opening 504 may physical facilitate contact between an inside corner of the thumb 14 and the bow stick 450 at the area 530. The thumb opening 504 may allow for proper ventilation of the thumb 14 to minimize perspiration and/or discomfort.

As shown in FIG. 12, the fingers 15, 16, 17 and 18 may be placed over and/or adjacent the fingers stabilizer 500. More specifically, a portion of the index finger 15 may abut a contact area on one side of the finger separator 522 and a portion of the middle finger 16 may abut a contact area on the other side of the finger separator 522. A common error in finger placement is for the index finger 15 to abut the middle finger 16 during the bow hold. Thus, as shown in FIG. 12, the finger separator 522 may serve to space the index finger 15 and the middle finger 16 from one another during the bow hold. Preferably, the finger separator 522 spaces the index and middle fingers 15 and 16 as the fingers are spaced when hanging naturally from a relaxed hand (e.g., approximately half the thickness of the index finger 15). Correct index finger placement on the bow stick 450 may aid tone production and articulation by allowing the person 10 to apply controlled downward pressure, or pronation.

As further shown in FIG. 12, an end of the index finger 15 may make contact with the shaft 456 and an end of the middle finger 16 may make contact with the ferrule 468. Preferably, the index finger 15 may make contact with the shaft 456 between the first and second joints. The ring finger 17 may be close to, or even abut, the middle finger 16. The pinky finger 18 may abut a portion of the body 501, with an end of the pinky finger 18 making contact with the frog 462. Though, in other embodiments, the pinky finger 18 may extend over a portion of the body 501, with the end of the pinky finger 18 resting on the contact area 526 of the body 501.

Another common error in finger placement is for the middle finger 16 to begin to wander towards the distal end 452 of the bow stick 450 during the bow hold. The finger separator 522 of the fingers stabilizer 500 may abut the middle finger 16, thereby preventing it from moving out of position along the shaft 456.

Although illustrated and described herein with reference to certain specific embodiments, it will be understood by those skilled in the art that the invention is not limited to the embodiments specifically disclosed herein. Those skilled in the art also will appreciate that many other variations for the specific embodiments described herein are intended to be within the scope of the invention as defined by the following claims.

What is claimed:

1. A bow hold training device for a bow stick of a bowed stringed instrument, the bow hold training device comprising:
    a fingers stabilizer comprising:
        a body having an axis that is parallel to a longitudinal axis of a bow stick shaft;
        a thumb opening in the body for receiving at least a portion of a thumb and positioning an end of the thumb at an approximate intersection of a bow stick frog and the bow stick shaft;
        a finger separator for positioning an index finger and a middle finger on the bow stick by separating the index and middle fingers from one another, and
        a post extending from the body at a non-zero angle with respect to the axis of the body, wherein an end of the post abuts the bow stick frog to position the fingers stabilizer on the bow stick.

2. The bow hold training device of claim 1, wherein the thumb opening facilitates contact between the end of the thumb and the bow stick shaft.

3. The bow hold training device of claim 1, wherein the fingers stabilizer further comprises a thumb opening wall that defines a perimeter of the thumb opening, and
    wherein the thumb opening wall guides the thumb to the bow stick shaft at an angle of about forty-five degrees with respect to the axis of the body and encourages a joint of the thumb to bend.

4. The bow hold training device of claim 1, wherein the finger separator protrudes from the body at an angle of about forty-five degrees with respect to the axis of the body.

5. The bow hold training device of claim 1, wherein the finger separator encourages an area between a first joint and a second joint of the index finger to make contact with the bow stick shaft.

6. The bow hold training device of claim 1, wherein the finger separator includes a surface for abutting the middle finger and preventing a hand from moving out of position towards a distal end of the bow stick.

7. The bow hold training device of claim 1, wherein the finger separator includes a first surface and a second surface for abutting the index and middle fingers, respectively, and
    wherein the finger separator spaces the index and middle fingers as when the index and middle fingers are hanging from a relaxed hand.

8. The bow hold training device of claim 1, wherein the fingers stabilizer comprises a shaft passageway extending generally parallel with the axis of the body, and
    wherein the shaft passageway receives at least a portion of the bow stick shaft to secure the fingers stabilizer to the bow stick.

9. The bow hold training device of claim 1, wherein the fingers stabilizer further comprises a notch at the end of the post for receiving at least a portion of the bow stick frog.

10. The bow hold training device of claim 1, wherein the fingers stabilizer further comprises a lateral stabilizing surface extending from the body, and
wherein the lateral stabilizing surface abuts a side of the bow stick frog to prevent the fingers stabilizer from rotating circumferentially around the bow stick shaft.

11. The bow hold training device of claim 1, wherein the fingers stabilizer includes respective contact surfaces on the body for positioning the index finger, the middle finger, a ring finger, and a pinky finger on the bow stick.

12. The bow hold training device of claim 1, wherein the fingers stabilizer includes a nester extending from the body, and
wherein the nester nests within a recess of the bow stick frog to position the fingers stabilizer on the bow stick.

13. The bow hold training device of claim 1, wherein the bow stick is a violin bow stick or a cello bow stick.

14. The bow hold training device of claim 1, further comprising a second fingers stabilizer comprising:
a second body having an axis that is parallel to the longitudinal axis of the bow stick shaft;
a pinky finger opening in the body for receiving at least a portion of a pinky finger and positioning an end of the pinky finger on the bow stick, wherein the pinky finger opening extends through at least a portion of the second body at a non-zero angle with respect to the axis of the second body; and
a second finger separator on the second body, wherein the second finger separator includes a surface for abutting a ring finger to separate the ring and pinky fingers from one another.

15. The bow hold training device of claim 14, wherein the pinky finger opening in the second body positions the end of the pinky finger on the bow stick shaft so that a distance between the respective contact points of the thumb and the pinky finger is approximately equal to a distance between the respective contact points of the thumb and the index finger.

16. The bow hold training device of claim 14, wherein the second fingers stabilizer is slidably disposed on the bow stick shaft to adjust a spacing between the second fingers stabilizer and the fingers stabilizers for the thumb, index and middle fingers.

17. The bow hold training device of claim 14, wherein the pinky finger opening in the second body includes a first opening and a second opening that has a smaller diameter than the first opening,
wherein second fingers stabilizer further comprises tapered sidewalls connecting the first and second openings to one another, and
wherein the first opening, the second opening, and the tapered sidewalls guide the pinky finger into position on the bow stick and facilitate lateral movement of the pinky finger during the bow hold.

18. The bow hold training device of claim 17, wherein the tapered sidewalls prevent the pinky finger from slipping out of position on the bow stick.

19. The bow hold training device of claim 14, wherein the second finger separator spaces the ring and pinky fingers as when the ring and pinky fingers are hanging from a relaxed hand.

20. The bow hold training device of claim 14, wherein the second fingers stabilizer further comprises a shaft hole in the second body extending generally parallel to the axis of the second body, and
wherein the shaft hole receives at least a portion of the bow stick shaft to secure the second fingers stabilizer to the bow stick.

21. The bow hold training device of claim 14, wherein the second fingers stabilizer further comprises sidewalls that define a slot extending generally parallel to the axis of the second body, and
wherein the slot receives at least a portion of the bow stick shaft.

22. The bow hold training device of claim 21, wherein at least a portion of each of the sidewalls extend over at least a portion of the bow stick shaft and the bow stick frog to prevent the second fingers stabilizer from rotating circumferentially around the bow stick shaft.

23. A bow stick for playing a bowed stringed instrument, the bow stick comprising:
a shaft having a distal end and a proximal end;
a frog disposed on the shaft proximal to the proximal end;
a bow hold training device disposed on the shaft proximal to the frog, wherein the bow hold training device comprises:
a body;
a thumb opening in the body for facilitating contact between an end of the thumb and the bow stick;
a thumb opening wall defining a perimeter of the thumb opening, wherein the thumb opening wall guides a thumb to the bow stick and positions the end of the thumb at an approximate intersection of the frog and the shaft;
a first finger contact area on the body for abutting an index finger and positioning the index finger on the bow stick;
a second finger contact area on the body for abutting a middle finger and positioning the middle finger on the bow stick;
a finger separator between the first and second finger contact areas, wherein the finger separator separates the index and middle fingers from one another, and
a post extending from the body, wherein the post abuts the frog to locate the bow hold training device on the shaft.

24. The bow stick of claim 23, wherein the bow hold training device is further comprises a nester extending from the body, wherein the nester is disposed within a recess of the frog to locate the bow hold training on the shaft.

25. The bow stick of claim 23, wherein the bow hold training device further comprises third and fourth finger contact areas for positioning a ring finger and a pinky finger, respectively, on the bow stick.

26. The bow stick of claim 23, wherein the bow hold training device further comprises a lateral stabilizing surface abutting a side of the frog to prevent the body from rotating circumferentially around the shaft.

27. The bow stick of claim 23, wherein the bow hold training device further comprises a shaft hole extending generally parallel to a longitudinal axis of the shaft and receiving at least a portion of the shaft.

28. The bow stick of claim 23, wherein the bow hold training device further comprises a second body for positioning a ring finger and a pinky finger on the bow stick.

29. The bow stick of claim 28, wherein the second body is slidably disposed on the shaft to adjust a distance between the first and second bodies of the bow hold training device.

30. The bow stick of claim 28, wherein the first body positions the index finger a first distance from the thumb,
wherein the second body positions the pinky finger a second distance from the thumb, and
wherein the first distance is approximately equal to the second distance.

31. The bow stick of claim 28, wherein the second body comprises:
a pinky finger opening in the second body for receiving at least a portion of the pinky finger, wherein the pinky finger opening includes a first opening and second opening;
tapered sidewalls connecting the first and second openings to one another;
a finger separator for separating a ring finger and the pinky finger from one another; and
a shaft hole in the second body for receiving at least a portion of the shaft.

32. The bow stick of claim 28, wherein the second body further comprises sidewalls that define a slot for receiving at least a portion of the shaft, and
wherein at least a portion of each of the sidewalls extend over at least a portion of the shaft to prevent the second body from rotating circumferentially around the shaft.

33. The bow stick of claim 23, wherein the bow stick is a violin bow stick or a cello bow stick.

34. A bow hold training device for properly positioning a person's fingers on a bow stick of a bowed stringed instrument, the bow hold training device comprising:
a thumb, index and middle fingers stabilizer comprising:
a body axis that is parallel to a longitudinal axis of a bow stick shaft;
a thumb opening wall defining a thumb opening, wherein the thumb opening wall guides a thumb to a bow stick shaft at a non-zero angle with respect to the body axis and causes a first joint of the thumb to bend, and wherein the thumb opening facilitates contact between an end of the thumb and the bow stick shaft; and
a index and middle fingers separator having a first contact surface for abutting an index finger and a second contact surface opposite the first contact area for abutting a middle finger; and
a ring and pinky fingers stabilizer comprising:
tapered sidewalls defining a pinky finger opening for receiving at least a portion of a pinky finger and facilitating contact between an end of the pinky finger and the bow stick shaft, wherein the ring and pinky fingers stabilizer is movably disposed on the bow stick to position the pinky finger opening so that the pinky and index fingers are equidistant from the thumb; and
a ring and pinky fingers separator adjacent the pinky finger opening, wherein the ring and pinky fingers separator includes a surface for abutting a ring finger.

35. A fingers stabilizer for properly positioning a person's fingers on a bow stick of a bowed stringed instrument, the fingers stabilizer comprising:
a body having an axis that is parallel to a longitudinal axis of a bow stick shaft:
a thumb opening in the body for facilitating contact between an end of the thumb and a bow stick shaft;
a thumb opening wall defining a perimeter of the thumb opening, wherein the thumb opening wall guides the thumb to the bow stick shaft at a non-zero angle with respect to the axis of the body and causes a first joint of the thumb to bend, and wherein the thumb opening facilitates contact between an inside corner of the thumb and the bow stick shaft;
a contoured surface on the body, wherein the contoured surface comprises:
an index finger contact area;
a middle finger contact area;
a ring finger contact area; and
a pinky finger contact area; and
a fingers separator on the body between the index finger contact area and the middle finger contact area, wherein the fingers separator spaces the index and middle fingers from one another,
wherein at least one of the index finger contact area, the middle finger contact area, the ring finger contact area and the pinky finger contact area define one or more recesses for contacting a portion, other than an end portion, of a corresponding finger to position and retain the corresponding finger on the bow stick and maintain one of a desired finger curvature and a desired finger shape.

36. A bow hold training device for a bow stick of a bowed stringed instrument, the bow hold training device comprising:
a fingers stabilizer comprising:
a first body having an axis that is parallel to a longitudinal axis of a bow stick shaft;
a thumb opening in the first body for receiving at least a portion of a thumb and positioning an end of the thumb at an approximate intersection of a bow stick frog and the bow stick shaft;
a finger separator for positioning an index finger and a middle finger on the bow stick by separating the index and middle fingers from one another; and
a second body for positioning a ring finger and a pinky finger on the bow stick,
wherein the second body is slidably disposed on the bow stick shaft to adjust a distance between the first and second bodies of the bow hold training device.

37. A bow hold training device for a bow stick of a bowed stringed instrument, the bow hold training device comprising:
a fingers stabilizer comprising:
a first body having an axis that is parallel to a longitudinal axis of a bow stick shaft;
a thumb opening in the first body for receiving at least a portion of a thumb and positioning an end of the thumb at an approximate intersection of a bow stick frog and the bow stick shaft;
a finger separator for positioning an index finger and a middle finger on the bow stick by separating the index and middle fingers from one another; and
a second body for positioning a ring finger and a pinky finger on the bow stick,
wherein the second body comprises:
a pinky finger opening in the second body for receiving at least a portion of the pinky finger, wherein the pinky finger opening includes a first opening and second opening;
tapered sidewalls connecting the first and second openings to one another;
a finger separator for separating the ring finger and the pinky finger from one another; and
a shaft hole in the second body for receiving at least a portion of the bow stick shaft.

* * * * *